(12) United States Patent
Smith et al.

(10) Patent No.: US 8,171,616 B2
(45) Date of Patent: May 8, 2012

(54) METHOD OF MAKING AN ARMATURE

(76) Inventors: David J. Smith, Columbia, MD (US);
John C. Stone, Queensbury, NY (US);
Robert Tumberlinson, Glen Rock, PA
(US); Earl M. Ortt, Bel Air, MD (US)

( * ) Notice: Subject to any disclaimer, the term of this patent is extended or adjusted under 35 U.S.C. 154(b) by 0 days.

(21) Appl. No.: 13/023,854

(22) Filed: Feb. 9, 2011

(65) Prior Publication Data
US 2011/0126399 A1    Jun. 2, 2011

Related U.S. Application Data

(62) Division of application No. 11/943,646, filed on Nov. 21, 2007, now Pat. No. 7,908,736.

(51) Int. Cl.
*H01R 43/10* (2006.01)
(52) U.S. Cl. ............................................. 29/597; 29/596
(58) Field of Classification Search ...................... 29/597
See application file for complete search history.

(56) References Cited

U.S. PATENT DOCUMENTS

| | | |
|---|---|---|
| 1,642,057 A | 9/1927 | Apple |
| 1,888,211 A | 11/1932 | Apple |
| 1,888,613 A | 11/1932 | Apple |
| 2,019,064 A | 10/1935 | Apple |
| 2,232,812 A | 2/1941 | Studer |
| 2,820,014 A | 1/1958 | Hartley |
| 2,831,991 A | 4/1958 | Perkins |
| 3,212,170 A | 10/1965 | Marshall |
| 3,407,491 A | 10/1968 | Clevenger et al. |
| 3,468,020 A | 9/1969 | Carlson et al. |
| 3,709,457 A | 1/1973 | Church |
| 3,813,763 A | 6/1974 | Church |
| 3,859,400 A | 1/1975 | Ma |
| 3,893,792 A | 7/1975 | Laczko |
| 3,932,083 A | 1/1976 | Boettner |
| 3,963,949 A | 6/1976 | Church |
| 4,263,711 A | 4/1981 | Sakano et al. |
| 4,341,972 A | 7/1982 | Penn et al. |
| 4,362,490 A | 12/1982 | Machida et al. |
| 4,470,786 A | 9/1984 | Sano et al. |
| 4,559,464 A | 12/1985 | Stokes |
| 4,818,910 A | 4/1989 | Reisenweber |
| 4,863,651 A | 9/1989 | Koten et al. |
| 4,983,866 A | 1/1991 | Lok |

(Continued)

FOREIGN PATENT DOCUMENTS

DE    1021466    12/1957
(Continued)

*Primary Examiner* — Derris Banks
*Assistant Examiner* — Azm Parvez
(74) *Attorney, Agent, or Firm* — Amir Rohani

(57) ABSTRACT

An armature for an electric motor has a lamination stack on a shaft with a commutator mounted on one end of the shaft. Magnet wires wound in slots in the lamination stack, the commutator and armature shaft are at least partially encapsulated in thermoset. The commutator has a commutator ring divided into a plurality of segments with slots between the segments that are filled with a second plastic when the commutator is made by molding a core of the second plastic, such as phenolic, in the commutator ring before the commutator ring is mounted on the armature shaft. Prior to molding the thermoset, the commutator ring is sealed. The seal prevents the thermoset from flowing into the slots between the commutator ring segments or over the commutator ring.

16 Claims, 18 Drawing Sheets

U.S. PATENT DOCUMENTS

| | | | |
|---|---|---|---|
| 5,003,212 | A | 3/1991 | Ibe et al. |
| 5,038,460 | A | 8/1991 | Ide et al. |
| 5,059,370 | A | 10/1991 | Kojima et al. |
| 5,639,403 | A | 6/1997 | Ida et al. |
| 5,668,428 | A | 9/1997 | Stojkovich et al. |
| 5,727,307 | A | 3/1998 | Gstohl et al. |
| 5,806,169 | A | 9/1998 | Trago et al. |
| 5,955,812 | A | 9/1999 | Warner |
| 6,057,626 | A | 5/2000 | Tanaka et al. |
| 6,451,230 | B1 | 9/2002 | Eckardt et al. |
| 6,477,763 | B1 | 11/2002 | Santander et al. |
| 6,735,846 | B2 | 5/2004 | Du |
| 6,946,758 | B2 | 9/2005 | Du et al. |
| 7,013,552 | B2 | 3/2006 | Du |
| 7,096,566 | B2 * | 8/2006 | Du et al. ......... 29/596 |
| 7,215,048 | B2 | 5/2007 | Du et al. |
| 7,464,455 | B2 | 12/2008 | Du et al. |

FOREIGN PATENT DOCUMENTS

| | | |
|---|---|---|
| DE | 1844364 | 1/1962 |
| DE | 4021591 | 1/1992 |
| DE | 4330323 | 3/1995 |
| DE | 19834085 | 11/1999 |
| DE | 19834086 | 1/2000 |
| EP | 0489363 | 6/1992 |
| JP | 2002247813 | 8/2002 |
| JP | 2003134714 | 5/2003 |
| JP | 2003274592 | 9/2003 |

\* cited by examiner

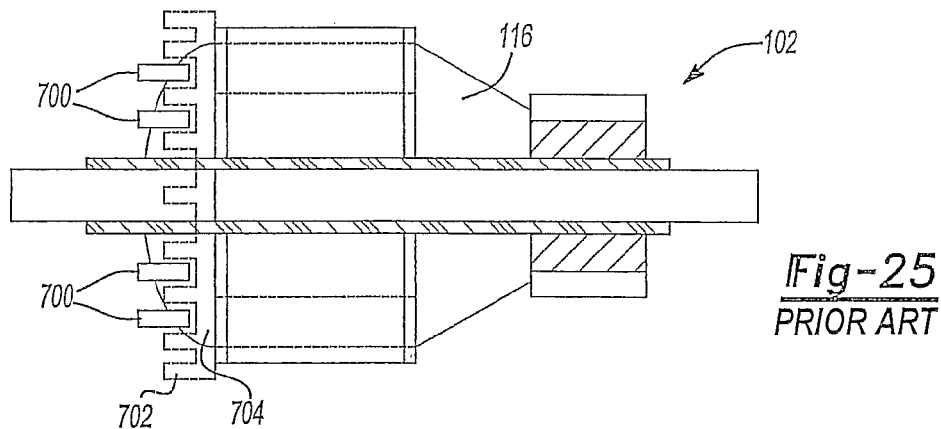
*Fig-25*
PRIOR ART
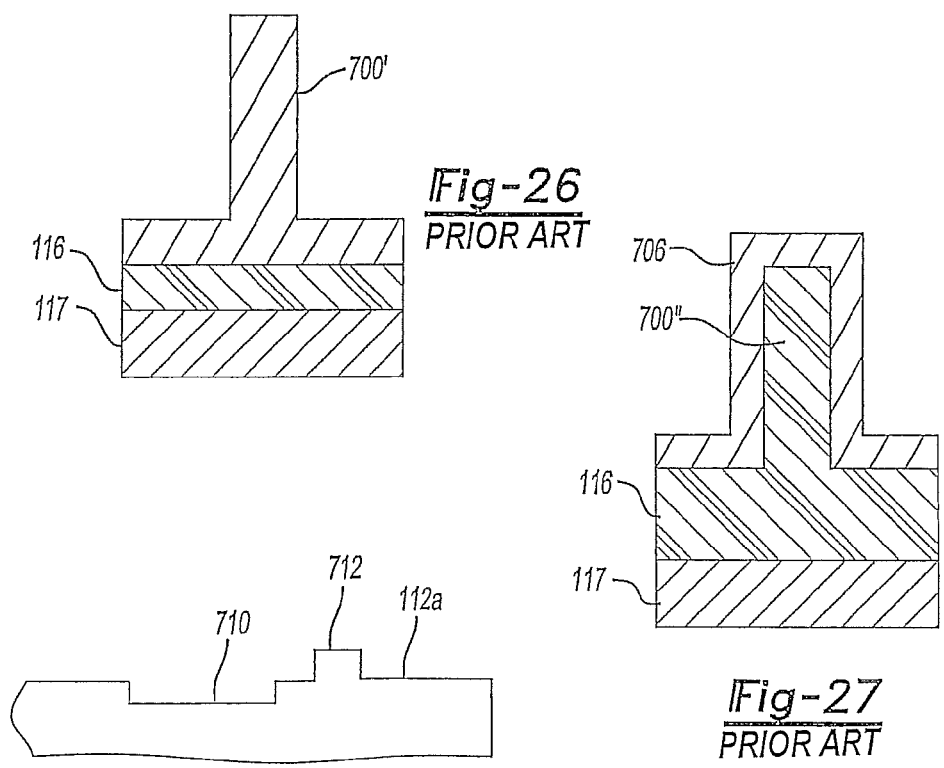
*Fig-26*
PRIOR ART
*Fig-27*
PRIOR ART
*Fig-28*
PRIOR ART

METHOD OF MAKING AN ARMATURE

CROSS-REFERENCE TO RELATED APPLICATIONS

This application is a divisional of U.S. patent application Ser. No. 11/943,646 filed on Nov. 21, 2007. The entire disclosure of the above application is incorporated herein by reference.

TECHNICAL FIELD

This invention relates to dynamoelectric machines, and more particularly to a dynamoelectric machine having a coil structure encapsulated with a thermoset material.

BACKGROUND

Dynamoelectric machines are machines that generate electric power or use electric power. Common types of dynamoelectric machines are alternators, generators, and electric motors.

Electric motors are used in a wide variety of applications involving power tools such as drills, saws, sanding and grinding devices, yard tools such as edgers and trimmers, just to name a few such tools. These devices all make use of electric motors having an armature and a field, such as a stator. The armature is typically formed from a lamination stack or core around which a plurality of windings of magnet wires are wound. The lamination stack is formed to have a plurality of poles around which the magnet wires are wound. In this regard, the lamination stack may be formed with a plurality of slots in which the magnet wires are wound. Insulators are typically provided between the magnet wires and the lamination stack. Magnet wires, as that term is commonly understood, are wires of the type conventionally used to wind coils in electric machines, such as armatures and stators. The magnet wires are coupled at their ends to a commutator, such as to tangs when the commutator is a tang type commutator, disposed on an armature shaft extending coaxially through the lamination stack.

The stator is also typically formed from a lamination stack around which a plurality of windings of magnet wires are wound. The ends of the magnet wires typically have terminals affixed that are then coupled to a source of electrical power. The lamination stack is formed to have a plurality of poles around which the magnet wires are wound. In this regard, the lamination stack may be formed with a plurality of slots in which the magnet wires are wound. Insulators are typically provided between the magnet wires and the lamination stack.

In the manufacturing process for the armature described above, once the magnet wires have been secured to the commutator, a "trickle" resin is applied over the magnet wires and over the ends of the magnet wires where they attach to tangs associated with the commutator. The process of applying the trickle resin is a somewhat difficult process to manage to obtain consistent results. It also has a number of drawbacks, not the least of which is the cost and difficulty of performing it with reliable, consistent results.

Initially, the trickle process requires the use of a relatively large and expensive oven to carefully preheat the partially assembled armatures to relatively precise temperatures before the trickle resin can be applied. The temperature of the trickle resin also needs to be carefully controlled to achieve satisfactory flow of the resin through the slots in the lamination stack of the armature. It has proven to be extremely difficult to achieve consistent, complete flow of the trickle resin through the slots in the lamination stack. As such, it is difficult to achieve good flow in between the magnet wires with the trickle resin. A cooling period must then be allowed during which air is typically forced over the armatures to cool them before the next manufacturing step is taken. Further complicating the manufacturing process is that the trickle resin typically has a short shelf life, and therefore must be used within a relatively short period of time. The manufacturing process for making wound stators may involve a similar trickle resin process.

Referring to FIG. 1, there is illustrated a prior art armature 10 made in accordance with a conventional manufacturing process incorporating the trickle resin application steps described hereinbefore. The armature 10 incorporates a lamination stack 12 having a plurality of longitudinal slots 14 disposed circumferentially therearound. Wound within the slots 14 is a large plurality of magnet wires 16 forming coils. An armature shaft 18 extends coaxially through the lamination stack 12 and includes a commutator 20. An independently formed plastic fan 22 is secured, typically by adhesives, to the lamination stack 12. The fan 22 typically includes a plurality of legs 24 which project into the slots 14, thus taking up space which would more preferably be occupied by the magnet wires 16. Trickle resin 26 is applied over the magnet wires 16, in the slots 14, and also at the tangs 25 where the ends 16a of the magnet wires 16 attach to the commutator 20.

Abrasive particles are drawn in and over the armature by the armature's fan, particularly when the armature is used in tools such as grinders and sanders. As shown particularly in FIG. 2, the air flow, shown by arrows 30, impinges magnet wires 16 of end coils 17 (the portion of the coils of magnet wires that extend around the ends of the lamination stack 12 between the slots 14 in the lamination stack 12). The air flow 30 contains abrasive particles and the impingement of these abrasive particles on magnet wires 16 can wear away the insulation of magnet wires 16.

With present day manufacturing techniques, an additional or secondary operation is often required to protect the armature (and specifically the magnet wires) from the abrasive particles. Such secondary operations include a coating of higher viscosity trickle resin, an epoxy coating, or wrapping the wires, such as with cotton, string or the like. This serves to further increase the manufacturing cost and complexity of the armature.

Still another drawback with the trickle process is the relatively high number of armatures which are often rejected because of problems encountered during the process of applying the trickle resin to an otherwise properly constructed armature. Such problems can include contamination of the commutator of the armature by the trickle resin during the application process, as well as uneven flow of the trickle resin if the pump supplying the resin becomes momentarily clogged. Accordingly, the difficulty in controlling the trickle resin application process produces a relatively large scrap rate which further adds to the manufacturing cost of electric motors.

Slot insulators and end spiders of armatures have been formed by insert molding the armature shaft and lamination stack in plastic. FIG. 3 shows such a prior art armature 40 having a lamination stack 42 on a shaft 44. Lamination stack 42 has a plurality of slots 46. The plastic is molded underneath the lamination stack 42 and around shaft 44 to insulate the shaft 44 from the lamination stack 42. The plastic is also molded to form end spiders 48 and molded in slots 46 to form slot liners 50. Slot liners 50 insulate the windings 52 from lamination stack 42 after the windings 52 have been wound in the slots 46 to form coils 54.

The plastic used in molding the prior art armature 40 has been plastic that is not thermally conductive, such as nylon or PPS. This can result in problems in dissipating the heat generated in the coils 54 during the operation of the motor in which armature 40 is used.

Most armatures or rotors used in dynamoelectric machines, such as motors and generators, are dynamically balanced to reduce the vibration force transmitted to the motor housing by way of the bearings. Dynamic balancing requires that material be added to or removed from the ends of the armature. The most beneficial places to do this are on planes near to the bearing planes at the largest possible radius. However, for practical reasons, universal motor armatures and permanent magnet motor armatures are usually balanced by selectively removing material from the surface of the iron core (also called the lamination stack).

This balancing process has a number of disadvantages. First, the planes in which the material are removed are located within the length of the lamination stack and thus are relatively distant from the bearing planes where the imbalance forces are transmitted to the rest of the product. Second, removal of material from the motor's active iron core (lamination stack) has a negative effect on performance, particularly, torque ripple. Third, balancing by removing material from the surface of the lamination stack requires that the tooth tops of the lamination stack be thicker than needed for spreading magnetic flux. The thicker tooth tops rob winding space from the slots in the lamination stack in which magnet wires are wound. Fourth, the surface of the lamination stack is not homogenous. It consists of iron at the tooth tops and air or resin in the winding slot area. This non-homogeneity presents a more difficult computation to the dynamic balancing machine that must decide how much material to remove and where to remove it from. Consequently, the dynamic balance machines often must make repetitive corrective passes during which even more iron is removed from the lamination stack, further reducing performance.

Coil stays have typically been used to hold the magnet wires, such as magnet wires 16, in the slots, such as slots 14, in the lamination stack, such as lamination stack 12. FIG. 4 shows one of slots 14 of lamination stack 12 of prior art armature 10 (FIG. 1) disposed between opposed poles 13 of lamination stack 12 and magnet wires 16 wound in slot 14. A slot liner 15, typically made of a paper insulation, is disposed in slot 14 between the magnet wires 16 and walls of lamination stack 12. Magnet wires 16 are retained in slot 14 by a coil stay 19, which is illustratively made of vulcanized fibers that are both electrically and thermally insulative. Such prior art coil stays have certain undesirable characteristics. First, they occupy space that could otherwise be filled with magnet wires 16. Second, the poor thermal conductivity of the coil stay material limits the amount of heat that can be transferred to the surface of lamination stack 12.

As is known, the power of a motor having magnet wires wound in slots of a lamination stack is a function of the current flowing through the magnet wires and the number of turns of magnet wires. A motor having a given output, i.e., 1/10 horsepower, 1/8 horsepower, 1/4 horsepower, requires that a certain number of turns of magnet wires that can carry a given current be used. The ability of the magnet wires to carry the given current is a function of the size (diameter) of magnet wires. The size of the magnet wires that must be used to wind the given number of turns of the magnet wires in turn dictates the size of the slots in which they are wound. That is, the slots must be large enough to hold the required number of turns of magnet wires.

If a larger size magnet wire can be used to wind the magnet wires, higher power can be achieved due to the decreased resistance of the larger size magnet wire compared with the smaller size magnet wire. However, using a larger size magnet wire to wind the magnet wires would typically require larger slots to accommodate the required number of turns of the larger size magnet wire, which in turn would require a larger lamination stack. Thus the armature would be larger.

Mains driven power tools, tools driven from power mains such as 120 VAC, are often double-insulated to protect the user from electric shock. Double-insulation requires two separate levels of electrical insulation: functional insulation and protective insulation. Functional insulation electrically insulates conductors from one another and from non-touchable dead-metal parts of the armature. An example of a non-touchable dead metal part is the lamination stack of the armature, such as lamination stack 12 (FIG. 1). The functional insulation system includes the core insulation, magnet wire film, and the resin matrix that bonds the whole together. Core insulation could also consist of epoxy coatings applied by a powder coating process.

The protective insulation consists of an electrically insulative tube or sleeve disposed between the touchable dead-metal shaft, such as shaft 18 (FIG. 1), and the rest of the armature structure. The shaft is considered touchable since it is in conductive contact with exposed conductive parts of the tool, such as a metal gearbox and/or metal spindle or chuck. In order to provide protection at the end of the tool's functional life due to abusive loads and burnout, the protective insulation barrier must have electrical, thermal, and structural properties that are superior to those of the functional insulation system. Therefore, the insulating tube or sleeve is usually constructed of high-temperature, glass reinforced thermosetting resin. Other materials such as ceramic, mica, and composites of these materials could also be used to make the insulating tube or sleeve.

SUMMARY OF THE INVENTION

In an aspect, a thermoset material is used to partially encapsulate the magnet wires, commutator and armature shaft. A seal is placed around the commutator ring and prevents the thermoset material from flowing into the slots between the commutator segments or over the commutator ring.

In an aspect, the seal is a flexible seal and in an aspect, an annular seal. In an aspect, the flexible annular seal is an o-ring. In an aspect, a contact between the flexible seal and a resin dam of the commutator stops a flow front of the thermoset material.

In an aspect, the commutator is a tang type commutator and the flexible annular seal sits against axial outer facing ends of the tangs and has a radial inner surface that sits against a resin dam of the cylindrical core of the commutator. In an aspect, the flexible seal sits against a feature(s) near the tangs, such as a step in the copper of the commutator. In an aspect, the flexible seal has protrusions that extend between the tangs of the tang type commutator.

In an aspect, the commutator is a stuffer type commutator and the flexible annular seal sits against axial outer facing surfaces of risers of the commutator ring and/or a resin dam of the cylindrical core of the commutator.

BRIEF DESCRIPTION OF THE DRAWINGS

The various advantages of the present invention will become apparent to one skilled in the art by reading the following specification and subjoined claims and by referencing the following drawings in which:

FIG. 25 is a perspective view of a prior art armature having features for heat transfer;

FIG. 26 is a side view of features of the prior art armature of FIG. 25;

FIG. 27 is a side view of features of the prior art armature of FIG. 25;

FIG. 28 is a side section view, broken away, of a prior art armature shaft having features that interlock with plastic molded around them;

DETAILED DESCRIPTION OF THE PREFERRED EMBODIMENTS

Figure 5:
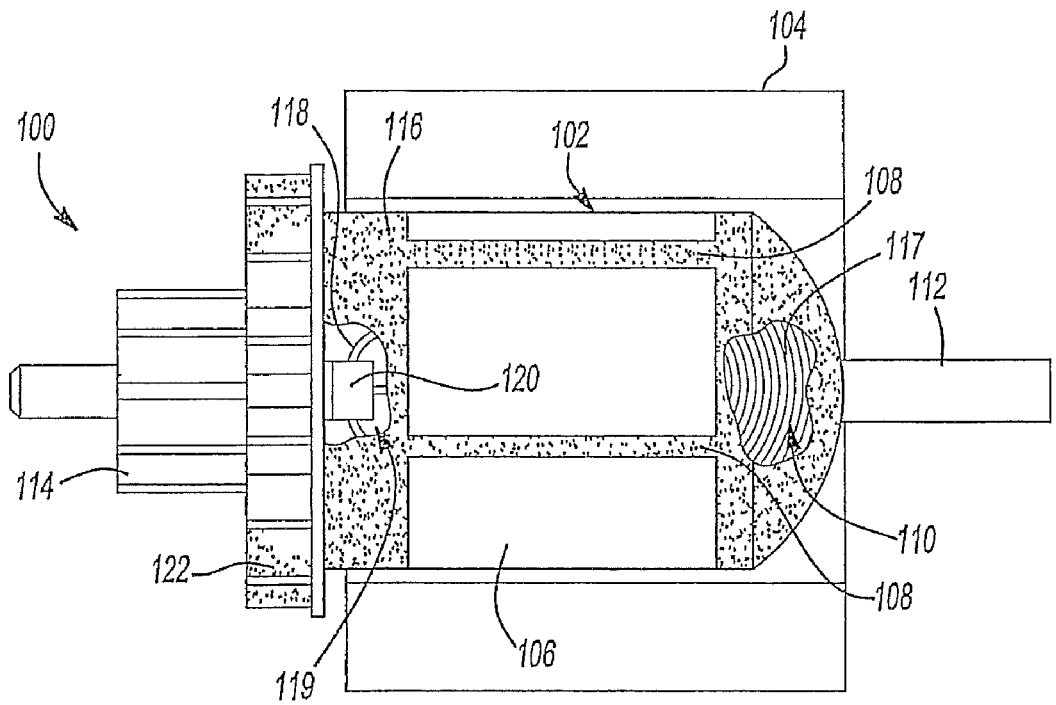
FIG. 5 is a side elevation view of a prior art armature.

Referring now to FIG. 5, a prior art motor 100 is disclosed. The motor 100 includes an armature 102 and a stator 104, the stator being illustrated in highly simplified fashion. The armature 102 incorporates a lamination stack 106 having a plurality of longitudinal slots 108 arranged circumferentially therearound. A plurality of magnet wires 110 are wound in the slots 108 to form a plurality of coil windings having end coils 117. An armature shaft 112 extends coaxially through the lamination stack 106 and has disposed on one end thereof a commutator 114. A thermally conductive plastic 116 is injection molded over the armature 102 so that the plastic flows into and through each of the slots 108. The thermally conductive plastic 116 is applied by placing the armature 102 in a suitable injection molding tool and then injecting the thermally conductive plastic 116 under a suitably high pressure into the molding tool. The thermally conductive plastic 116 preferably at least partially encases the magnet wires 110, and more preferably completely encases the magnet wires to form an excellent means for transferring heat therefrom. The plastic 116 also encases the ends 118 of armature lead wires 119 of the magnet wires 110 which are secured to tangs 120 operably associated with the commutator 114.

A fan 122 is also integrally formed during the molding of the thermally conductive plastic 116 at one end of the lamination stack 106. Forming the fan 122 as an integral portion of the thermally conductive plastic 116 serves to completely eliminate the manufacturing steps in which a trickle resin is applied to the lamination stack 106 and then a separately formed fan is adhered to the lamination stack 106.

The molding of the thermally conductive plastic 116 to substantially or completely encase the magnet wires 110 serves to efficiently conduct heat away from the magnet wires. Thus, the thermally conductive plastic 116 even more efficiently serves to secure the magnet wires 110 to the lamination stack 106 to prevent movement of the wires, as well as to secure the magnet wires to the tangs 120 and to improve the conduction of heat from the wires.

The molding of the fan 122 as an integral portion of the thermally conductive plastic coating 116 also provides a significant manufacturing benefit by removing the cost associated with separately forming such a fan component and then securing the component via an adhesive to the lamination stack 106. This allows the fan 122 to be constructed even more compactly against the lamination stack 106 which allows a motor to be constructed which requires less space than previously developed motors employing independently formed fans.

Another advantage of having the fan 122 molded from the thermally conductive plastic is that the fan will be even more resistant to high temperatures which might be encountered during use which stresses the motor 100. With previously developed motors, the fan mounted to the armature thereof is often the first component to fail because of high temperatures encountered during periods of high stress of the motor. The armature 102, with its integrally molded fan 122, is significantly more resistant to failure due to high temperatures.

The injection molding of a thermally conductive plastic may also more efficiently fill the spaces and voids in between the magnet wires 110 extending through the lamination stack slots 108, thus promoting even more efficient cooling of the armature 102 during use.

Plastic 116 is molded to completely encapsulate all the elements of armature 102, including lamination stack 106 and commutator 114. Thereafter, excess plastic 116 is removed from armature 102, such as by machining, to expose those portions of armature 102 that need to be exposed, such as the surface of commutator 114 and the surface of lamination stack 106.

Encapsulation also provides enhanced mechanical retention of magnet wires 110 and can be used in lieu of the adhesive typically used to secure the armature lead wires 119. Particularly in high vibration applications, the armature lead wires must be supported, that is, affixed in place. Otherwise, rotation of the armature and vibration of the device in which the motor having the armature is used, such as a power tool, can cause the armature lead wires to vibrate and eventually fatigue and break. Typically, during the trickle resin process described above, a high viscosity adhesive is applied around the armature lead wires up to where they attach to the commutator. This adhesive provides the required support for the armature lead wires.

Plastic 116 is illustratively molded around armature lead wires 119 when plastic 116 is molded around magnet wires 110. Plastic 116 provides the necessary support for the armature lead wires 119 to prevent them from vibrating when the armature 102 rotates and the device, such as a power tool having a motor using armature 102 vibrates. The armature lead wires 119 can thus be supported by the encapsulation of plastic 116 at little or no additional cost. Moreover, the enhanced mechanical retention provided by encapsulation allows larger gauge magnet wires 110 to be employed on a given size armature, thus increasing the amp rating which can be attained with a motor of given dimensions over a comparably sized motor employing trickle resin sealing of the magnet wires. The larger gauge magnet wires 110 provide better heat transfer and lower heat generation, as well as lower resistance as discussed below.

The thermally conductive plastic 116 is a illustratively base polymer, such as nylon (nylon 4,6, for example), PPS, PPA, liquid crystal polymer (LCP), or a blend of these, with an appropriate fill percentage of a thermally conductive material such as ceramic (abrasive or lubricious) and, illustratively, an appropriate amount of glass fill for strength. Aluminum oxide is a common type of abrasive ceramic used in thermally conductive plastic and boron nitride is a common type of lubricious ceramic. It should be understood that other thermally conductive materials, metallic or non-metallic, can be used as the fill material, such as aluminum nitride, aluminum or copper. By using a blend for the base polymer, some of advantages of using a more expensive polymer, such as LCP, can be realized without incurring the cost of using 100% of the more expensive polymer as the base polymer. For example, blending LCP with PPS at a ratio of about 10% LCP to 90% PPS increases moldability and strength compared to pure PPS. Similarly, a small amount of nylon could be used instead of LCP.

Thermally conductive plastic 116 can illustratively be Konduit® thermoplastic commercially available from LNP Engineering Plastics of Exton, PA (presently a General Electric company). In this regard, the thermally conductive plastic 116 can illustratively be Konduit® PDX-TF-212-11 modified to have about ten percent more ceramic fill.

A "phase change additive" can be added to the material used to encapsulate the armature. As used herein, a "phase change additive" is a material that changes phases, such as from solid to liquid or liquid to gas, at a temperature that is below the temperature at which the material used to encapsulate the armature melts but above ambient temperatures.

Preferably, the phase change material is one that changes phases from solid to liquid. The phase change additive would increase the capability of the encapsulation material, such as thermally conductive plastic 116, to handle short term heat spikes that it might not otherwise be able to dissipate quickly enough. When heat spike occurs, the phase change additive changes phase absorbing heat. The phase change additive may illustratively be compounded in small spheres or particles that are added to the plastic used to encapsulate the armature. The capacity of the plastic encapsulating the armature to withstand short heat spikes can then be adjusted by adjusting the amount of phase change additive that is added to it. By using the phase change additive, plastic having lower thermal conductivity, that may be less expensive, can then be used to encapsulate the armature. Use of the phase change additive could also increase the capacity of plastic 116 to withstand the additional heat generated in spikes in more demanding applications. Phase change additives can include parafins, waxes, hydrated salts and possibly crystalline plastics such as acetal or nylon. An example of a hydrated salt phase change additive is the TH89° C. available from TEAP Energy of Wangar, Perth Western Australia.

While plastic 116 is illustratively a thermally conductive thermoplastic, other types of materials can be used to encapsulate armature 102, including thermoset materials, as long as the material is electrically non-conductive and has sufficient dielectric strength throughout the operating temperature of armature 102. In this regard, plastic 116 should illustratively have a dielectric strength of at least 250 volts/mil. up to a temperature of 300° C. when armature 102 is used in a power tool. Further, whe re thermal conductivity of the encapsulating material is not needed, then it need not be thermally conductive. In this regard, while the encapsulation process has been described in the context of injection molding, it should be understood that other processes could be used, such as transfer molding or compression molding. The process used would, of course, need to be suitable for the material being used to encapsulate the armature. For example, transfer molding and compression molding are typically used to mold thermoset materials and injection molding used to mold both thermoplastic and thermoset materials.

With the armature 102, the thermally conductive plastic 116 may comprise a high temperature nylon or thermoset material which is further mixed with a suitable non-ferromagnetic material such as ceramic, aluminum or copper, to provide essentially the same density as that of the magnet wires 110. Thus, when each of the lamination stack slots 108 are completely filled with the plastic 116 and the magnet wires 110, the weight of the material filling each slot 108 is essentially the same. Since the weight of the material filling each slot 108 is essentially the same, the need to balance the armature on a balancing machine, after the molding step, is eliminated. Eliminating the balancing step represents a substantial cost savings because no longer is the use of a balancing machine required, as well as the manual labor of setting each of the armatures up on the balancing machine. Instead, once the armatures have cooled after the injection molding process, the armatures can proceed to the commutator turning operation and then directly to the assembly stage where they are assembled with other components to form motors. LNP Engineering Plastics, Inc. is a source of specifically formulated plastics.

Figure 1:
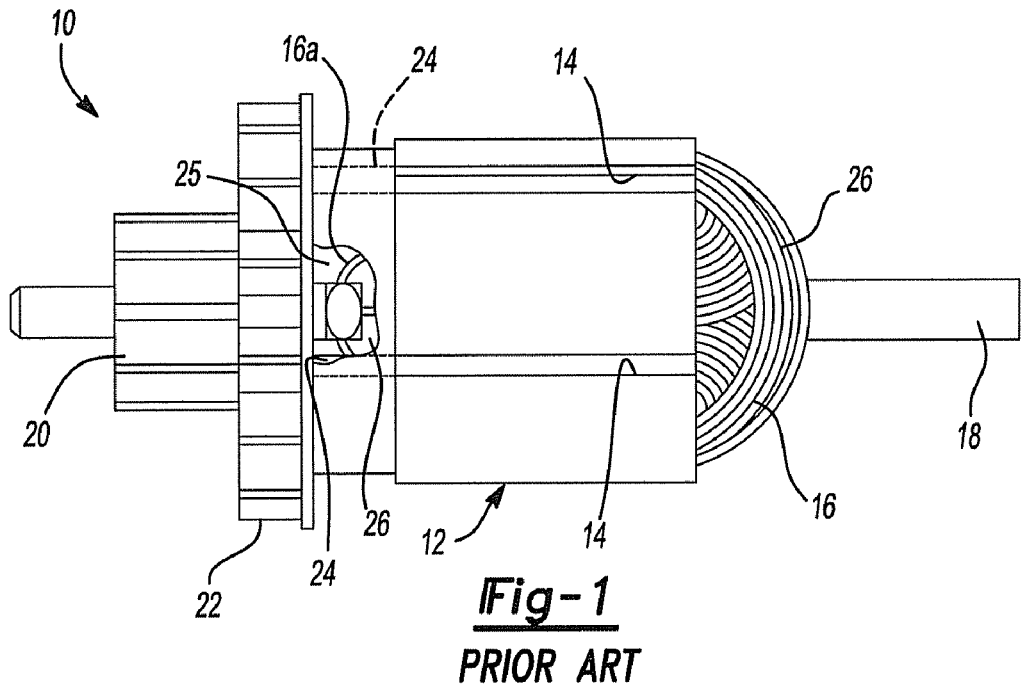
FIG. 1 is a side elevation view of a prior art armature which incorporates the conventional trickle resin coating and separately manufactured fan secured by adhesives to the armature.
Figure 2:
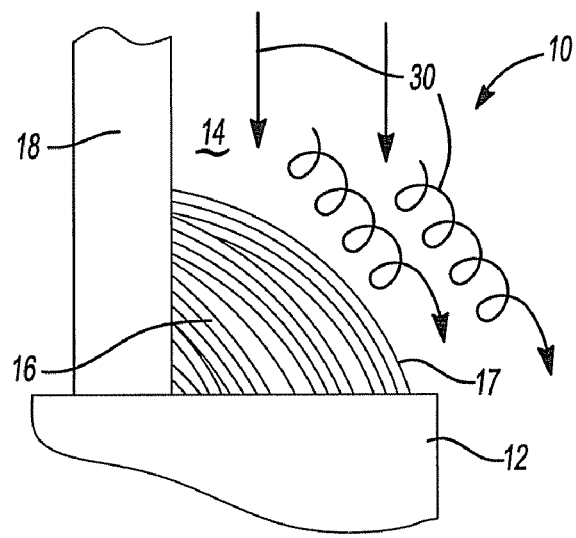
FIG. 2 is a schematic view of air flow around end coils of a prior art armature.
Figure 6:
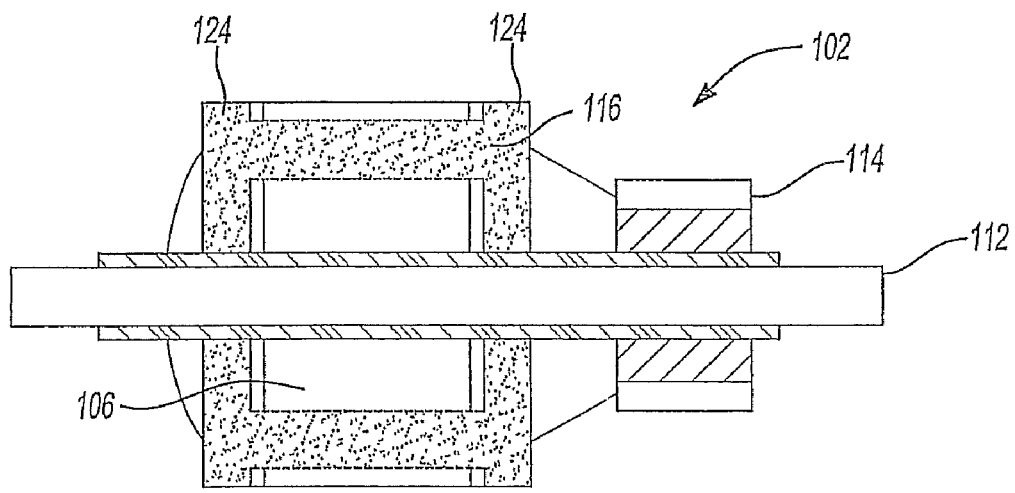
FIG. 6 is a side elevation view of a prior art armature.
Figure 7:
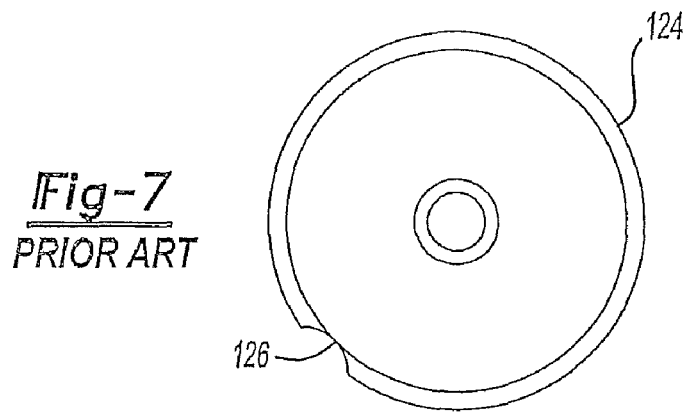
FIG. 7 is an end view of the armature of FIG. 6.

Turning to FIGS. 6 and 7, another aspect of the prior art is described. Elements in common with FIG. 5 will be identified with the same reference numerals. When plastic 116 is molded to encapsulated armature 102, features are molded to improve the process of balancing armature 102. These features illustratively include one or more of extra sacrificial material molded at the periphery of end coils 117 (FIG. 2) formed by the windings of magnet wires 110 or molded pockets that may receive balance weights. Utilizing such features in the balancing of armature 102 eliminates the machining of non-homogenous material, eliminates the removal of active iron, permits the thickness of the teeth tops of the teeth of lamination stack 106 to be smaller, and locates the balance planes nearer to the bearing planes allowing truer balancing with less material removed or added.

Referring specifically to FIG. 6, armature 102 includes one or more balancing rings 124 molded of plastic 116 when plastic 116 is molded to encapsulate armature 102. Illustratively, a balancing ring is molded adjacent each axial side of lamination stack 106 over end coils 117. With specific reference to FIG. 7, during balancing of armature 102, material is removed from one or more of the balancing rings 124 at one or more points 126. Balancing rings 124 are located closer to the bearing planes (not shown) of the motor (not shown) using armature 102 and are inert, that is, do not include active iron. Consequently, removing material from balancing rings 124 does not affect the magnetic characteristics of lamination stack 106 and thus does not adversely affect the performance of the motor in the way that removing iron from lamination stack 106 does.

Figure 8:
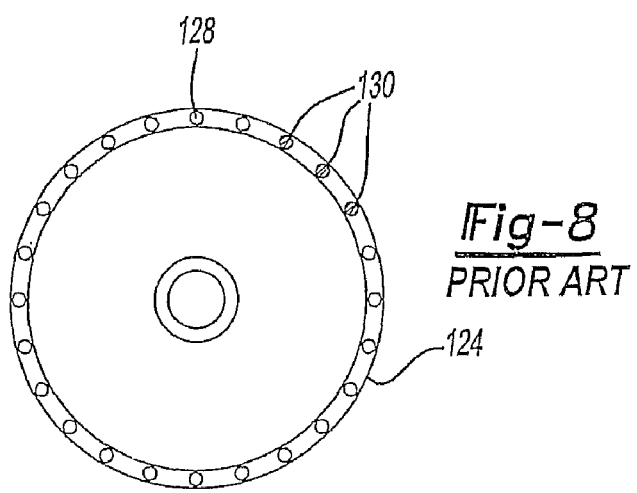
FIG. 8 is an end view of a variation of the prior art armature shown in FIGS. 6 and 7.
Figure 9:
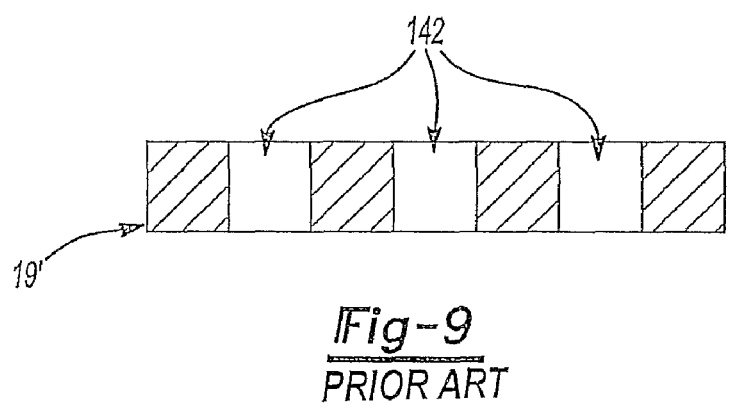
FIG. 9 is a prior art coil stay.

In a variation, balancing rings 124 have pockets or cavities 128 formed therein. During balancing of armature 102, weights 130 are inserted and fixed in one or more pockets 128 (FIG. 8) (only one of which is identified by reference numeral 128) of one or more of balancing rings 124 to balance armature 102. Weights 130 are also located nearer the bearing planes and are also inert. In this variation, balancing rings 124 can be made lighter.

In another aspect of the prior art, the mass of plastic 116, the distribution of the molded plastic 116, or both, can be varied to adjust the spinning inertia of armature 102. The mass of plastic 116 can be varied by varying the amount of plastic 116 used, varying its density, or both. The density of plastic 116 can be varied by, for example, the amount of non-ferromagnetic material mixed with plastic 116. The distribution of the molded plastic 116 controls the spinning inertia of armature 102 by placing more or less plastic 116 around the axis of armature shaft 112, such as closer to or further away from the axis of armature shaft 112.

Armatures, as is known, have a natural frequency at which they resonate, commonly referred to as the resonant frequency. This frequency is a function of the geometry and stiffness of the armature. In another aspect of the prior art, the natural or resonant frequency of armature 102 can be adjusted by varying the geometry, physical and/or mechanical (physical) properties of plastic 116. Varying the geometry, physical and/or mechanical (such as its tensile or flexural modulus) properties of plastic 116 varies the stiffness of armature 102. For example, increasing the physical (such as density, hardness, or both) of plastic 116 provides vibration damping for armature 102. Also, increasing the stiffness of armature 102 increases its critical speed, that is, the rotational speed at which armature 102 resonates. The critical speed of the armature is often the limiting factor of how fast a motor can spin in that its speed must be kept below the critical speed. By increasing the critical speed, the maximum speed at which the motor can be run is increased, which increases the output power that the motor can provide. For example, applicants have found that using an encapsulated armature in a small angle grinder (a DeWalt DW802 SAG), the critical speed of the armature was increased about 11.5%, that is, from 39,300 RPM to 43,800 RPM.

Plastic 116 also provides structural reinforcement around armature shaft 112 to reduce and/or control vibration and flexing of armature shaft 112. The geometry and mechanical properties of plastic 116 can be adjusted to obtain the desired vibration and/or flex reduction/control of armature shaft 112.

Bondable wire is typically used to adhere wires, such as magnet wires in a field, together without the addition of glue or varnish in a secondary operation, such as the above described trickle resin operation. Bondable wire has a layer of material thereon that becomes sufficiently viscous when hot that it adheres together adjacent wires in the bundle of wires forming the coil and then hardens to bond the wires together. This forms a coil that is mechanically solid and also has improved thermal properties due to the reduction of air pockets between wires. One type of bondable wire has a layer of heat activated adhesive thereon. A type of this bondable wire having a layer of heat activated adhesive thereon is available under the trade name BONDEZE from Phelps Dodge of Fort Wayne, Ind.

With reference to the embodiment described in FIG. 5, when the thermally conductive plastic 116 is molded around magnet wires 110, thermally conductive plastic 116 may not fill all the interstitial voids between the magnet wires 110. In another aspect of the prior art, magnet wires 110 can be bondable wires that are then encapsulated in a hot encapsulation material. In an embodiment, the bondable wire is BONDEZE wire. The heat of the hot encapsulation material, such as injection molded thermally conductive plastic 116, activates the layer of heat activated adhesive on magnet wires 110, bonding magnet wires 110 together.

Figure 10:
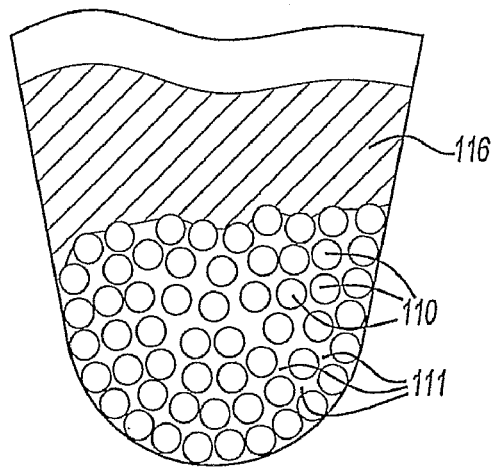
FIG. 10 is a view of a section of a slot in a prior art lamination stack with bondable magnet wires therein with the heat activated adhesive of the bondable magnet wires having been activated by the heat of plastic as it is molded.

FIG. 10 shows slot 108 having magnet wires 110 encapsulated in thermally conductive plastic 116 where the heat of the thermally conductive plastic as it was molded around magnet wires 110 activated heat activated adhesive 111 bonded magnet wires 110 together. This forms a mechanically solid coil inside thermally conductive plastic 116. This reduces or prevents movement of the coil and improves thermal transfer, as described above. This aspect of the prior art further contributes to the elimination of the need for the trickle resin process of bonding the magnet wires together. Further, the heat generated during the molding process activates the heat activated adhesive obviating the need to separately activate the heat activated adhesive 111, such as by baking in an oven or passing a current through magnet wires 110 to heat them to activate the heat activated adhesive. For this aspect of the prior art, the temperature of the encapsulation material being used just needs to exceed the temperature required to activate the heat activated adhesive on the magnet wire 110.

Figure 11:
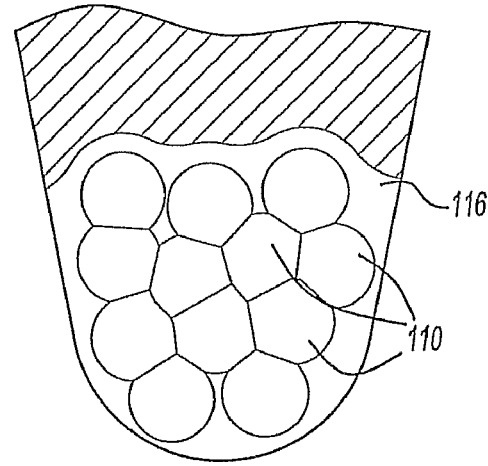
FIG. 11 is a view of a section of a slot in a prior art lamination stack with magnet wires therein deformed by pressure of plastic molded around.

Turning to FIG. 11, another aspect of the prior art is described. FIG. 11 shows magnet wires 110 in one of lamination slots 108 encapsulated by thermally conductive plastic 116. By setting the pressure at which the plastic 116 is molded around magnet wires 110 at a sufficiently high level, magnet wires 110 can be at least partially deformed into polygonal shapes from their original round shape. This increases the surface area contact between magnet wires 110 and thus improves thermal conductivity from the bottom magnet wires 110 through the other magnet wires 110 into thermally conductive plastic 116. It is thought that the foregoing is advantageous when the diameter of magnet wires 110 or the fill pattern of magnet wires 110 (such as how close they are compacted together) prevents each magnet wire 110 from being completely surrounded by thermally conductive plastic 116.

In another aspect of the prior art, the pressure at which the plastic 116 is molded around magnet wires 110 is set at a sufficiently high level to compact the wires together, providing for an increased fill rate in lamination slots 108. That is, a higher percentage of the volume of lamination slots 108 is filled with magnet wires. In this regard, magnet wires 110 may be initially wound in lamination slots 108 so that they extend close to or even beyond an outer surface of lamination stack 106. The pressure of the plastic 116 as it is molded then compacts the magnet wires 110 together and forces the compacted magnet wires 110 into slots 108.

Figure 4:
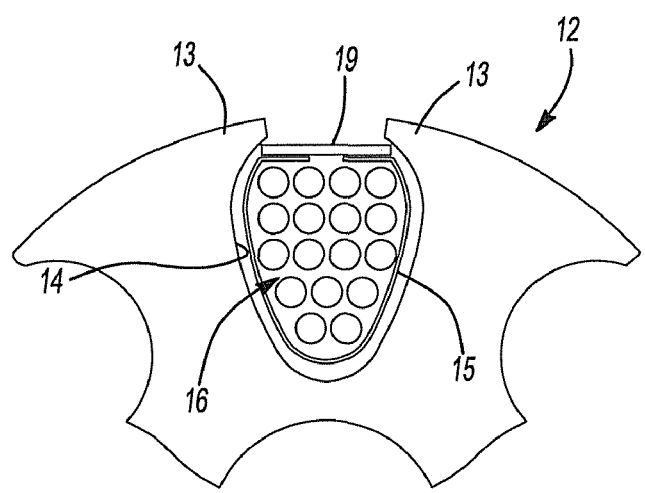
FIG. 4 is a side view of a section of a slot in a lamination stack of a prior art armature with magnet wires held therein by a coil stay.

In an aspect of the prior art, coil stays 19 (FIG. 4A) are made of thermally conductive plastic that is melted or wetted during molding of plastic 116.

In an aspect of the prior art, plastic 116 replaces coil stays 19 of prior art armature 10, and holds magnet wires 110 in place when it hardens.

In an aspect of the prior art, coil stays 19' (FIG. 4B) have holes 142 therein. During molding of plastic 116, plastic 116 flows through and bypasses coil stays 19'. Plastic 116 is illustratively a thermally conductive plastic, as described, and molding it through holes 142 in coil stays 19' allows more heat to flow toward the surface of the lamination stack, such as lamination stack 106 (FIG. 5).

Figure 12:
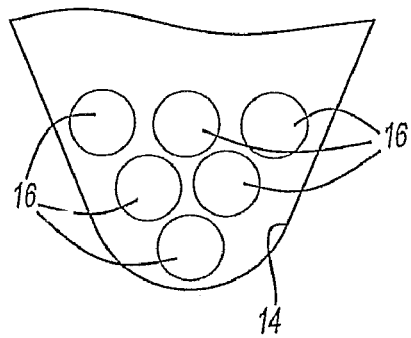
FIG. 12 is a view of a section of a slot in a prior art lamination stack with magnet wires therein.
Figure 13:
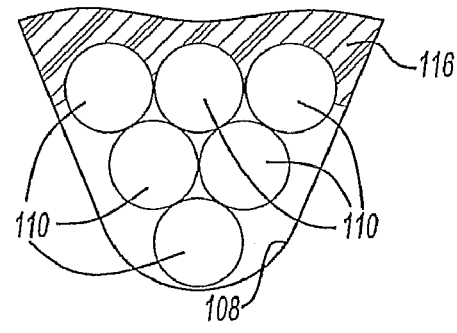
FIG. 13 is a view of a section of a slot in a prior art lamination stack with larger size magnet wires therein.

With reference to FIGS. 12 and 13, a larger size magnet wire is used to wind magnet wires 110 (FIG. 13) than to wind magnet wires 16 (FIG. 12). Slots 14 in FIG. 12 and slots 108 in FIG. 13 are the same size. In the prior art embodiment of FIG. 13, plastic 116 is molded at pressure around magnet wires 110 compacting them together in slots 108 allowing slots 108 to accommodate the magnet wires 110 wound with the larger size magnet wire. Magnet wires 110 can thus be a larger size magnet wire compared to magnet wires 16 of FIG. 12. Thus, magnet wires 110 wound in slots 108 of a given size, which dictates in large part the size of the lamination stack 106 having slots 108, can be a larger size magnet wire. This results in the motor having the magnet wires 110 wound with the larger size magnet wire having increased power compared with the motor having the magnet wires 16 wound with the smaller size magnet wire, yet having the same size lamination stack. Thus, a higher output motor having a given physical size is achieved.

Figure 14:
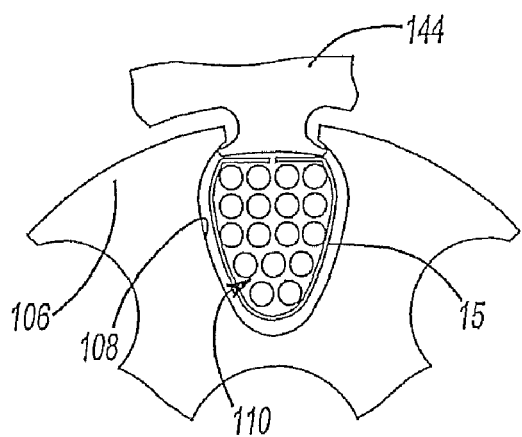
FIG. 14 is a view of a section of a slot in a prior art lamination stack in which magnet wires are compressed by iso-static pressure.

In an alternative prior art aspect of the foregoing, the magnet wires 110 are wound in slots 108 and then compacted, such as by the application of iso-static pressure, before armature 102 is encapsulated. For example, armature 102, after magnet wires 110 have been wound in slots 108 but before armature 102 is encapsulated, is placed in a properly shaped cavity of a fluid bladder, shown schematically as fluid bladder 144 in FIG. 14. The pressure of the fluid in fluid bladder 144 is increased, forcing magnet wires 110 deeper into slots 108. Armature 102 is then encapsulated, as described above, with the plastic 116 encapsulating armature 102 holding magnet wires 110 in slots 108 after plastic 116 hardens. In a variation of the above, magnet wires 110 are made of bondable wire, as described above, which are thermally cured during the compaction of magnet wires 110 by fluid bladder 144.

Figure 3:
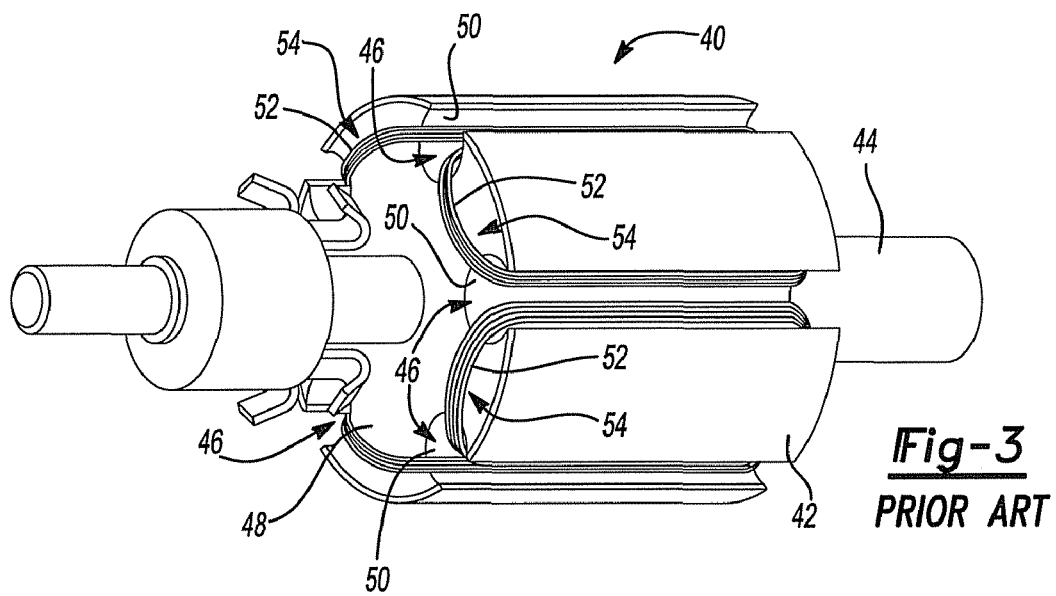
FIG. 3 is a perspective view of a prior art armature with plastic molded in slots in a lamination stack to form slot liners, at the ends of the lamination stack to form end spiders and around a shaft of the armature.

With reference to the prior art armature shown in FIG. 3, another aspect is described. In this prior art aspect, prior art armature 40 is modified by making it using thermally conductive plastic as the plastic in which armature shaft 44 and lamination stack 42 are insert molded. The thermally conductive plastic forms end spiders 48 and slot liners 50 in the manner described above and is also molded between shaft 44 and lamination stack 42 of armature 40 to electrically insulate shaft 44 from lamination stack 42. In this regard, the thermally conductive plastic is selected to have adequate thermal conductivity and dielectric strength or electrically insulative properties. The thermally conductive plastic can illustratively be Konduit.®

In armatures encapsulated in plastic it is important that plastic flash be prevented from entering the slots in the commutator ring when the plastic is molded. If flash enters the slots in the commutator ring, it may project outwardly from the slots and create a bump or ridge that the brushes will contact when the armature rotates.

Figure 17:
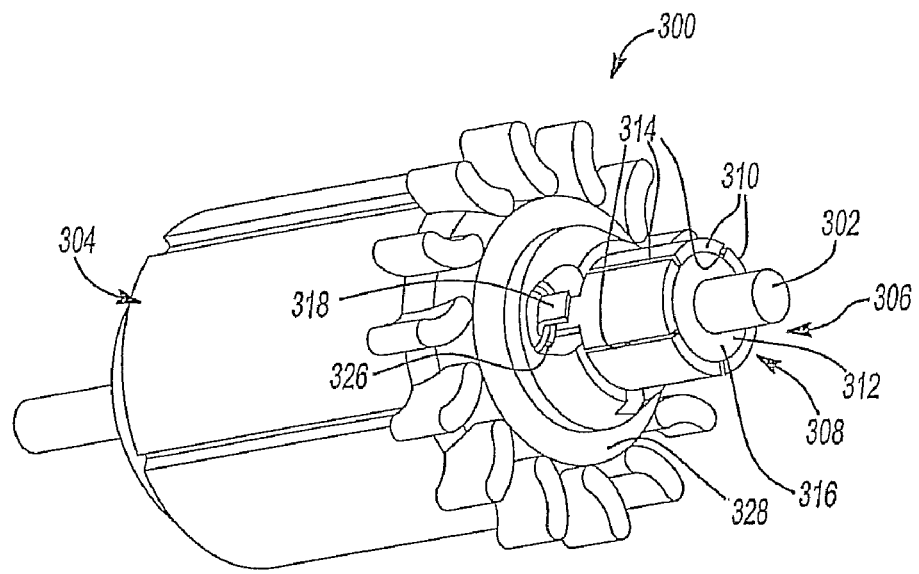
FIG. 17 is a perspective view of a prior art armature with a tang type commutator made so that plastic flash is prevented from getting in slots between segments of the commutator.
Figure 18:
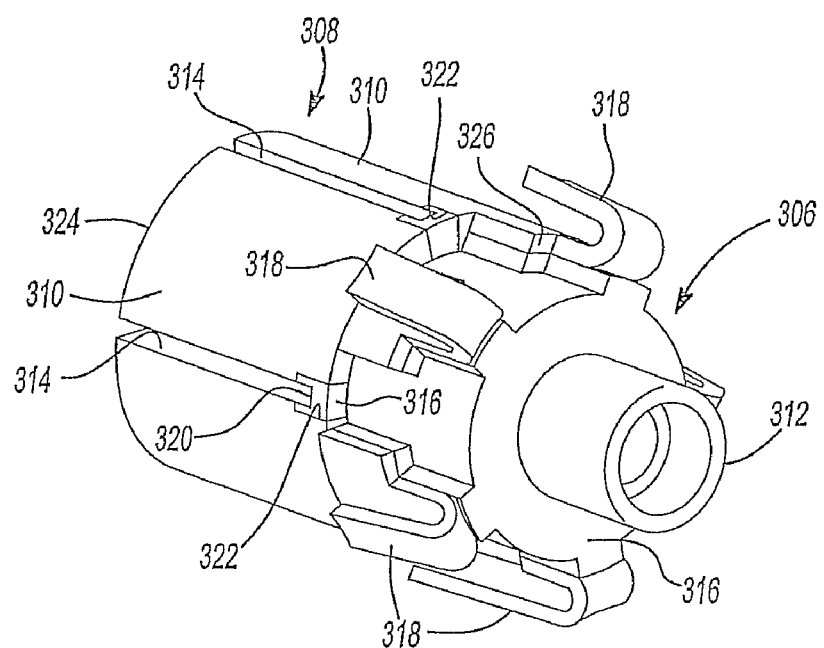
FIG. 18 is a perspective view of a prior art tang type commutator.

An aspect of the prior art described with reference to FIGS. 17-18 prevents flash from getting into the slots of a tang type commutator ring. An armature 300 has a shaft 302 and a lamination stack 304. A commutator 306 is mounted on one end of shaft 302. Commutator 306 includes a copper commutator ring 308, divided into a plurality of copper segments 310, around a cylindrical core 312, with slots 314 between adjacent segments 310, typically made in a slotting operation. Cylindrical core 312 is made of an electrically insulative material, such as phenolic. It should be understood that commutators can be made without slotting operations. In such commutators, the copper segments 310 are precisely made and positioned in making the commutators so that the copper segments 310 are spaced from each other the appropriate distance.

Each commutator segment 310 has a tang 318 extending from an axial inner end 326. Tangs 318 are electrically connected to ends of the magnet wires (such as magnet wires 110 of FIG. 5) in known fashion.

To form commutator 306, notches 322 are cut around axial inner end of commutator ring 308. Notches 322 are positioned so that they are below the track followed by the brushes (not shown) of the motor in which armature 300 is used and to be at the axial inner ends of slots 314 when they are cut. Plastic 316 is next molded in commutator ring 308, such as by insert molding commutator ring 308, to form cylindrical core 312 therein. Plastic 316 is illustratively phenolic. Plastic 316 fills notches 322.

Slots 314 are then cut in commutator ring 308. Slots 314 extend radially through commutator ring 308 and run axially from an axial outer end 324 of commutator ring 308 part way into the plastic 316 that filled notches 322.

Figure 19:
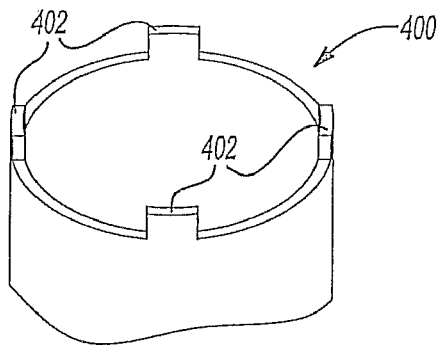
FIG. 19 is a view of a prior art mold, shown representatively, used in making the armature of FIG. 8.

Commutator 306, shaft 302 and lamination stack 304 are next assembled together and the ends of the magnet wires of armature 300 are connected to tangs 318 in conventional fashion. Shaft 302, with commutator 306, and lamination stack 304 are then placed in a mold 400 (shown representatively in FIG. 19) and plastic 328 (FIG. 17) molded around them to form armature 300 in similar manner to that described above with respect to FIG. 5 with the following differences. Mold 400 is provided with projections 402 that fit between tangs 318 over notches 322. Projections 402 prevent plastic 328 from flowing into slots 314 from the sides of slots 314 by providing thin wall flow regions that allow the plastic to freeze off quicker. The plastic 316 that filled notches 322 when cylindrical core 312 was molded prevents plastic 328 from flowing axially into slots 314 from the inner ends 320 of slots 314.

Figure 38:
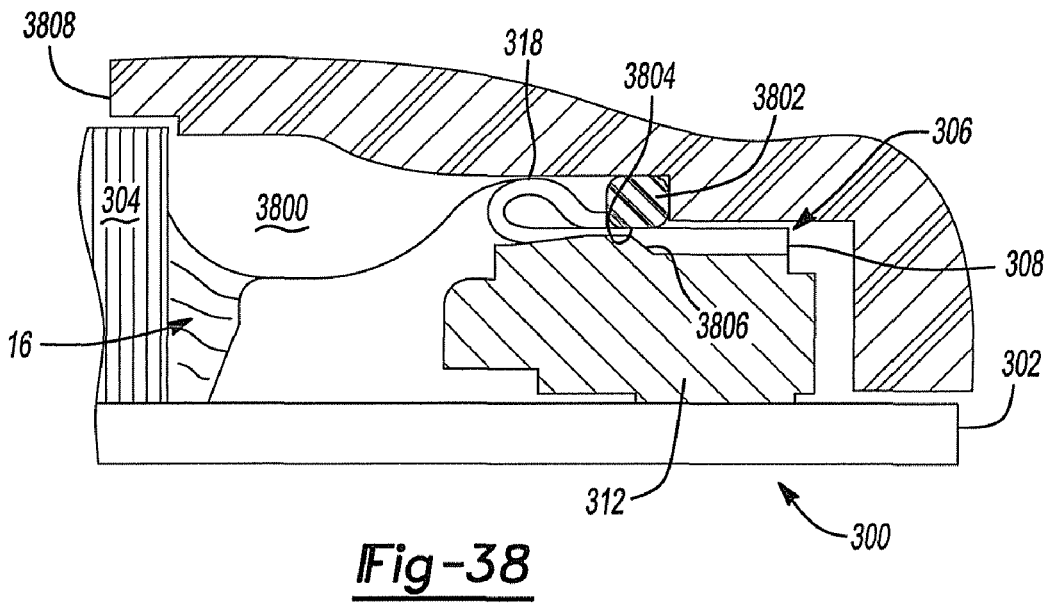
FIG. 38 is a side sectional view of an armature having a tang type commutator in a mold where a flexible seal disposed against tangs of the commutator prevents a thermoset material being molded from flowing into slots between segments of the commutator in accordance with an aspect of the invention.

Turning to FIG. 38, an alternative to the approach described above with respect to FIGS. 17 and 18 prevents flash from getting into the slots of a tang type commutator when a thermoset material is being molded. Like elements will be referred to with the same reference numbers and the discussion will focus on the differences. An armature 300 has the same elements as described above with reference to FIGS. 17 and 18 with the following differences. Notches 322 (FIG. 17) are not cut around the axial inner end of commutator ring 308 and the material that is molded to encapsulate at least a portion of the armature is thermoset material. To penetrate the magnet wires 110 and completely fill the armature, it is desirable that the thermoset material be liquid during molding. A side effect of the thermoset material being liquid during molding is that it also easily fills slots 314 between segments 310 of commutator ring 308 as well as flowing over commutator ring 308.

Figure 42:
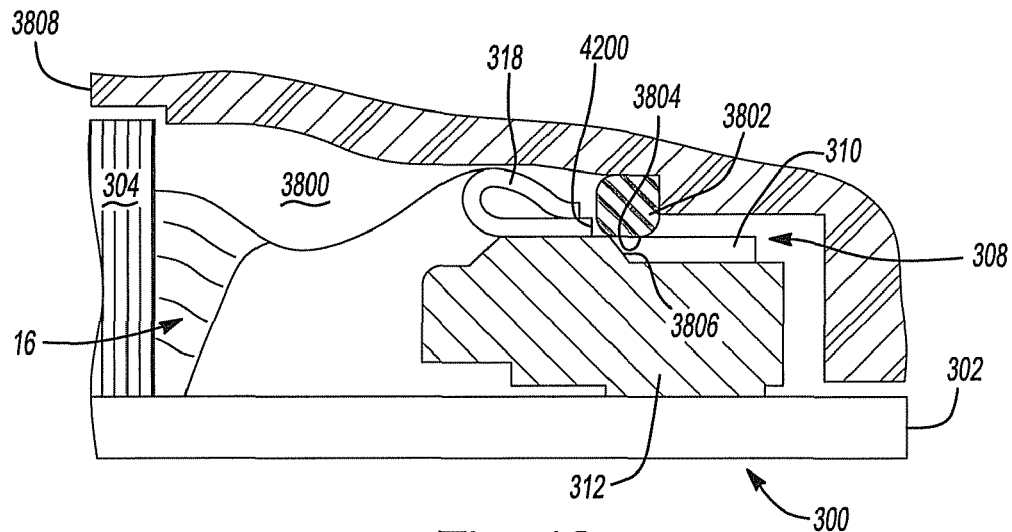
FIG. 42 is a side sectional view of an armature having a tang type commutator in a mold where a flexible seal disposed against a small step near tangs of the commutator prevents a thermoset material being molded from flowing into slots between segments of the commutator in accordance with an aspect of the invention.

A flexible seal is used to prevent flash from thermoset material 3800 from flowing into slots 314 between segments 310 of commutator ring 308 and/or over commutator ring 308. The flexible seal may illustratively be an annular flexible seal, such as annular flexible seal 3802. After commutator 306, shaft 302 and lamination stack 304 are assembled together and the ends of the magnet wires of armature 300 are connected to tang 318, annular flexible seal 3802 is disposed around commutator ring 308 so that it sits against axial outer facing ends of tangs 318 or against a feature(s) near tangs 318, such as a small step 4200 (FIG. 42) of commutator ring 308. A radially inner surface 3804 of annular flexible seal 3802 sits against a resin dam 3806 of cylindrical core 312 of commutator 306. Shaft 302, with commutator 306, and lamination stack 304, are then placed in a mold 3808 (shown representatively in FIG. 38) and thermoset material 3800 molded around them to form armature 300 in similar manner to that described above with respect to FIG. 5 with the following differences. The contact between annular flexible seal 3802 and resin dam 3806 is sufficient to cause a flow front of the thermoset material being molded to stop. This prevents the thermoset material from reaching the slots 314 between segments 310 of commutator ring 308 or flowing over commutator ring 308. After molding, the annular flexible seal 3802 may illustratively be removed from commutator ring 308. It may, alternatively, illustratively be left on commutator ring 308.

It should be understood that annular flexible seal 3802 can be used with commutators described above that are made without slotting operations. A resin dam similar to resin dam 3806 is formed in such commutators and the annular flexible seal 3802 is disposed against or near the tangs with its inside diameter (ID) abutting the resin dam.

Alternatively, rather than placing annular flexible seal 3802 around commutator ring 308 before shaft 302 with commutator 306 and lamination stack 304 are placed in a mold, the annular flexible seal 3802 is disposed in the mold. Then, shaft 302 with commutator 306 and lamination stack 304 thereon is placed in the mold so that the end of shaft 302 projecting from commutator 306 extends through annular flexible seal 3802 so that annular flexible seal 3802 butts up against resin dam 3806 of cylindrical core 312 of commutator 306. In an aspect, each annular flexible seal 3802 is used for several shots. In an aspect, the annular flexible seal 3802 remains in place in the mold for the several shots.

Figure 40:
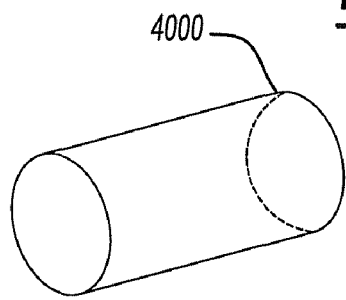
FIG. 40 is a perspective view of a flexible seal of FIGS. 38 and 39 that is a sleeve.
Figure 41:
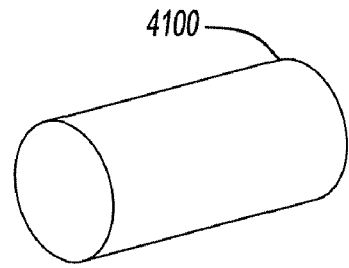
FIG. 41 is a perspective view of a flexible seal of FIGS. 38 and 39 that is a boot.

Annular flexible seal 3802 may illustratively be an o-ring made of a soft rubber or rubber like material, such as silicone, so that it easily conforms to the irregular surface on commutator 306, such to the axial outer surfaces of tangs 318. Annular flexible seal 3802 may illustratively be shapes other than an o-ring, such as a sleeve or a boot. For example, annular flexible annular flexible seal 3802 could be a sleeve 4000 (FIG. 40) or a boot 4100 (FIG. 41), or tape wrapped around commutator 306. Annular flexible seal 3802 may be made of material other than silicon, such as rubber or paper, as long as the material is sufficiently soft or pliable to conform to the irregular surfaces on commutator 306 and is otherwise suitable for use in molding the thermoset material being molded. The cross-section of annular flexible seal 3802 can be round, square, or other shapes.

It should be understood that the flexible seal may also have shapes such as oval, square, or other polygonal shapes suitable for the mold tooling and commutator geometry. The flexible seal can also be made of a variety of materials, some of which would prevent adhesion to the thermoset encapsulating material. Seals made with materials having a smooth surface, or made with a smooth surface, and/or made of silicon, or made from materials coated with a suitable release agent, such a Viton® fluoroelastomer material available from DuPont Performance Elastomers L.L.C. of Wilmington, Del., would provide the appropriate sealing needed to stop the flow front of the thermoset encapsulating material during molding while still allowing for easy removal of the seal.

Alternatively, the flexible seal can be made to adhere to the thermoset encapsualting material where the flexible seal is to remain on the commutator after molding. In which case, the flexible seal can be made of materials having rougher textures or made with a rougher surface texture. This would provide the benefit of not having to remove the flexible seal during manufacturing as well as minimizing the chance that the flexible seal might dislodge into the tooling during part ejection from the mold.

It should also be understood that instead of a flexible seal, the seal, such as seal 4400 (FIG. 44) could be made of a semi-rigid or rigid material. Such materials could include a theremoplastic of suitable temperature capability or thermoset materials such as a glass reinforced epoxy. Such materials provide the benefit of closing off or stopping the flow of the thermoset material being used to encapsulate the armature during molding that does not jeopardize the integrity of the commutator. They also provide the benefit of providing additional reinforcement to the commutator if the seal is left on the armature.

Figure 44:
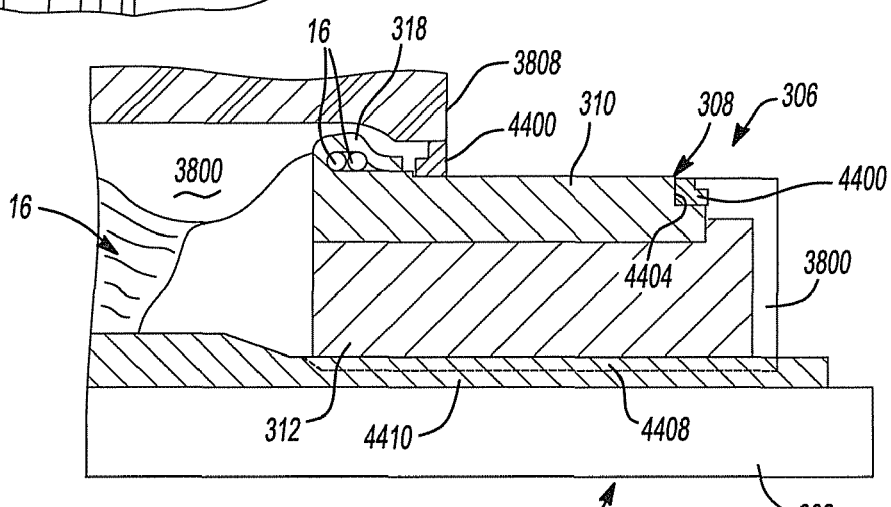
FIG. 44 is a side sectional view of an armature having a tang type commutator in a mold where a seal of semi-rigid or rigid material is disposed against a small step near tangs of the commutator and an another seal of semi-rigid or rigid material is optionally disposed at an axial outer end of the commutator ring where the seals prevent a thermoset material being molded from flowing into slots between segments of the commutator in accordance with an aspect of the invention.

With reference to FIG. 44, a seal 4400 made of a semi-rigid or rigid material is disposed against a step 4402 of commutator ring near tangs 318. It should be understood that seal 4400 could also be disposed against tangs 318. Another seal 4406, referred to as outer seal 4406, made of a semi-rigid or rigid material may optionally be disposed at an axial outer end 4404 of commutator ring 308. In one approach to facilitate molding of the encapsualting material around outer seal 4406, a flow channel 4408 (shown in phantom in FIG. 44) is provided between insulative sleeve 4410 around shaft 402 and cylindrical core 312 of commutator 306. (In armatures not having insulative sleeves around the armature shaft, flow channel 4408 is provided between armature shaft 302 and cylindrical core 312 of commutator 306.) Flow channel 4408 may illustratively be formed as a pattern, such as a knurled pattern, in the inner diameter (ID) of cylindrical core 312 of commutator 306 or in the outer diameter (OD) of insulative sleeve 4410.

Figure 43:
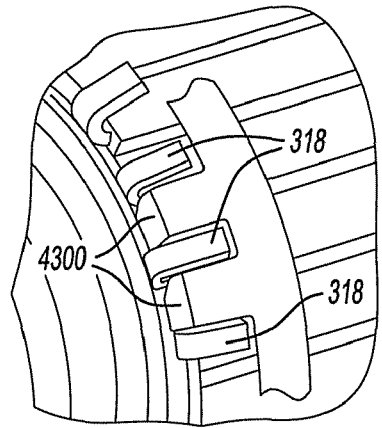
FIG. 43 shows a variation of the flexible seal of FIG. 38 having protrusions that extend between tangs of the commutator.

In an aspect, annular flexible seal 3802 has axial protrusions 4300 (FIG. 43) that extend between tangs 318 of commutator 306.

Another important property of the seal is that it be suitable for processing during the molding of the thermoset encapsualting material, and potentially be capable of withstanding the operating conditions in the motor (where the seal is left on the commutator after molding). For example, the material of which the seal is made must be capable of withstanding the temperature at which the thermoset encapsulating material is molded. For example, molding temperatures for presently available thermoset encapsualting materials that would typically be used to encapsulate armature 300 are about 160° C.

Figure 45:
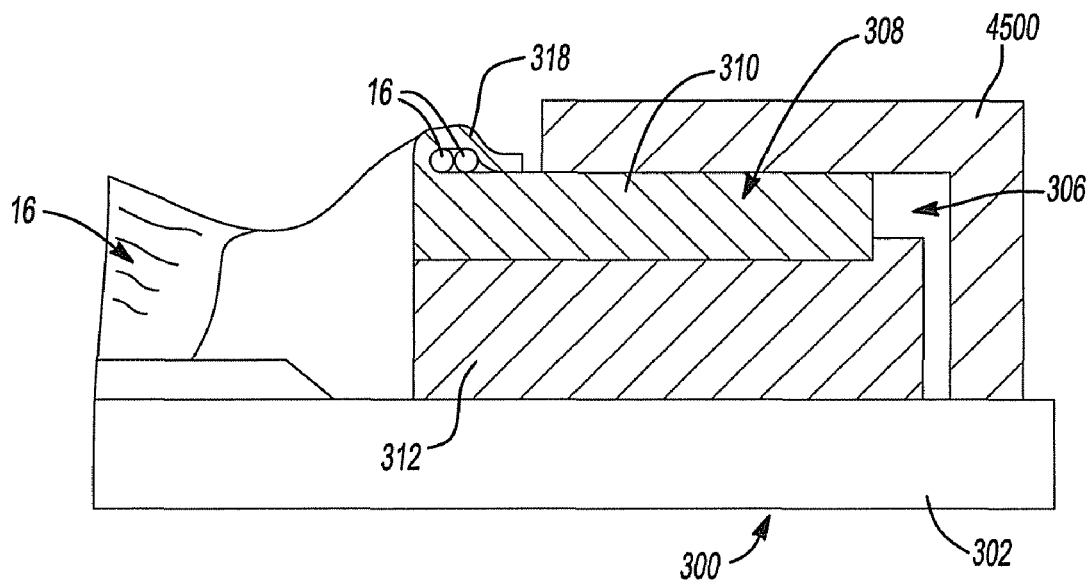
FIG. 45 is a side sectional view of an armature having a tang type commutator where a removable sleeve is placed over the commutator ring prior to placing the armature in a mold.

With reference to FIG. 45, another approach of sealing the commutator 306 to prevent flash from flowing over commutator ring 308 and/or into slots 314 is to place a removable sleeve 4500 of a mold (not shown) over commutator ring 308 prior to placing armature 300 into the mold. The removable sleeve 4500 could be made in a variety of sizes (IDs) and the removable sleeve 4500 having the appropriate tight fit for a given commutator be placed over the commuter ring 308 to prevent flashing during molding. The removable sleeve 4500 is then removed after molding.

Figure 46:
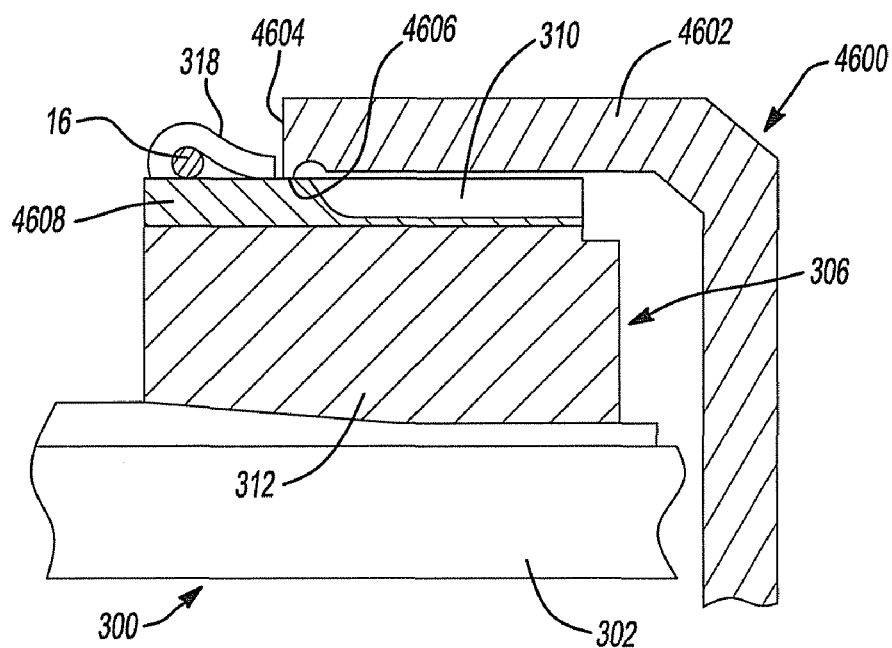
FIG. 46 is a side sectional view of an armature having a tang type commutator in a mold where the mold has a plurality of parts having sharp edges that seal against the segments of the commutator to prevent flash from flowing into slots between the segments of the commutator.

With reference to FIG. 46, another approach of sealing the commutator 300 to prevent flash from flowing over commutator 306 utilizes a plurality segments 4602 of the mold (not shown) (only one of which is shown in FIG. 46) that close around commutator ring 308 of commutator 306 near tangs 318, such as adjacent to tangs 318. Segments 4602 may illustratively be part of a collet 4600. Each segment 4602 has an inner end 4604 with a sharp radial inner arcuate edge 4606. Commutator 306 includes inserts 4608, such as mica inserts, disposed in slots 314 between segments 310. When armature 300 is placed in the mold, collet 4600 is disposed around commutator ring 308. Collet 4600 is then closed around commutator ring 308 so that sharp radial inner arcuate edges 4606 of inserts 4602 bear on commutator ring 308. Sharp radial inner arcuate edges 4606 press slightly into the copper of segments 310 and the mica inserts in slots 314 between segment 310 to form an annular seal around commutator ring 308 near tangs 318, which prevents flash during molding. In this regard, in an aspect, when collet 4600 is closed about commutator ring 308, an ID of the annular seal formed by the sharp radial inner arcuate edges 4606 of inserts 4602 is slightly less than an OD of the commutator ring 308, but an inner periphery of this annular seal otherwise conforms to an outer periphery of the commutator ring 308.

In another approach for addressing flash, the thermoset encapsulating material is molded over the commutator ring 308 of commutator 306 during molding rather than prevented from flowing over the commutator ring 308. The excess thermoset encapsulating material is then removed, such as by machining it off. The thermoset encapsulating material may then be left in the slots 314 in the commutator ring 308 between the copper segments 310. Or the commutator ring 308 may be slotted after the armature is encapsualted.

Figure 20:
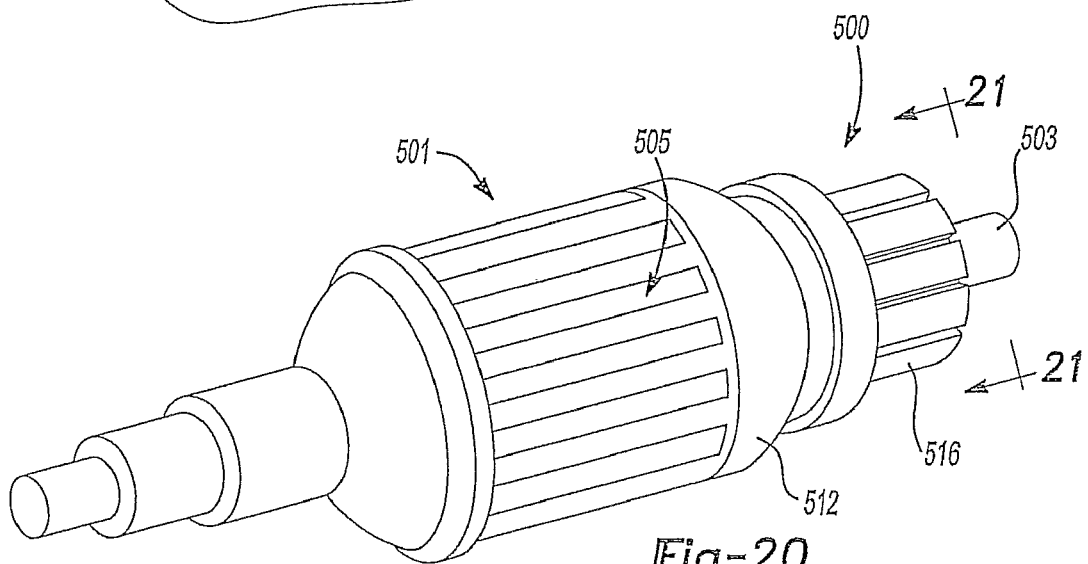
FIG. 20 is a perspective view of a prior art armature with a stuffer type commutator made so that plastic flash is prevented from getting in slots between segments of the commutator.
Figure 21:
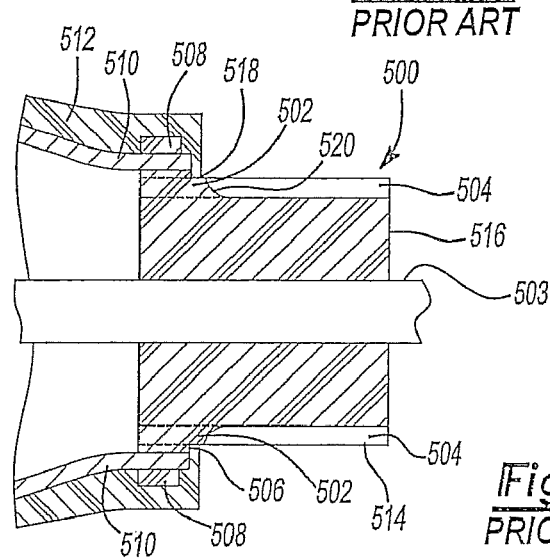
FIG. 21 is a section view of a partial section of the prior art armature of FIG. 11 taken along the line 21-21 of FIG. 20.

Turning to FIGS. 20 and 21, another aspect of the prior art for preventing flash from getting into the commutator slots in a stuffer type commutator is described. In a stuffer type commutator, inner ends of the segments of the commutator ring have slots into which ends of the magnet wires are pressed.

An armature 501 has a shaft 503 on which commutator 500, which is a stuffer type commutator, is mounted in known fashion. As is known, a stuffer type commutator, such as commutator 500, has a commutator ring 516 with slots 504 between segments 514. Inserts 502 extend part way into slots 504 from an inner end 506 of commutator ring 516. Inserts 502 are illustratively made of mica or plastic. Ends of magnet wires 510 are pressed into slots (not shown) in ends 508 of segments 514 of commutator ring 516.

Armature 501 is encapsulated by molding plastic 512 around its shaft 503 and lamination stack 505 in a manner similar to that described above. The tool or mold used in molding plastic 512 is configured so that it seals around inner end 506 of commutator ring 516 where inserts 502 are located in slots 504 of commutator ring 516, such at 518. Illustratively, ends 520 of inserts 502 extend distally beyond the point 518 where the tool seals around inner end 506 of commutator 500 and are thus disposed underneath the tool. When plastic 512 is molded, plastic 512 is molded around inner end 506 of commutator ring 516 only where inserts 502 are in slots 504 and plastic 512 is thereby prevented from flowing into slots 504.

Figure 39:
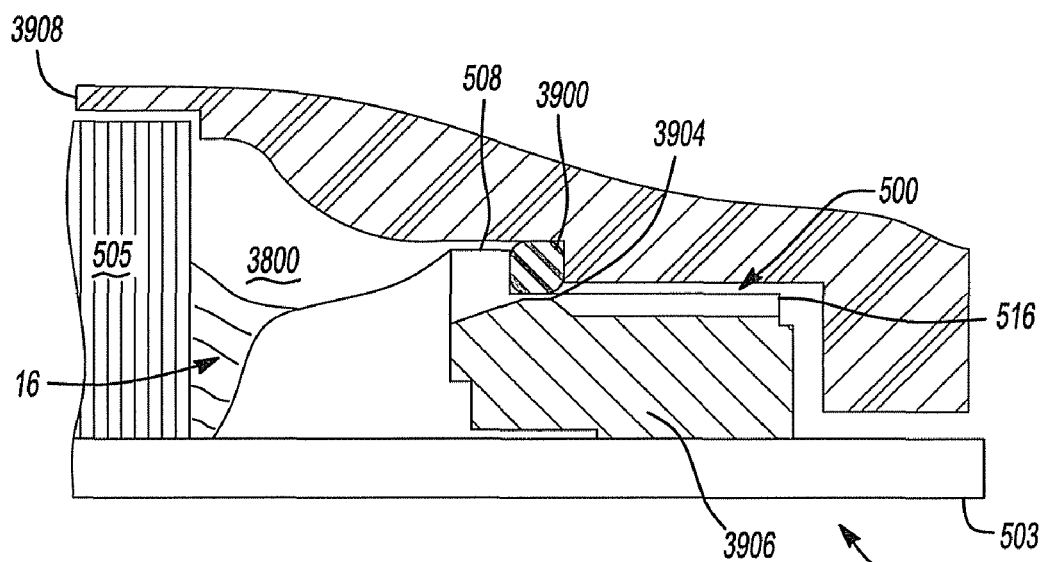
FIG. 39 is a side sectional view of an armature having a stuffer type commutator in a mold where a flexible seal disposed against risers of the commutator prevents a thermoset material being molded from flowing into slots between segments of the commutator in accordance with an aspect of the invention.

Turning to FIG. 39, an aspect of the invention that prevents flash from getting into the slots of a stuffer type commutator and/or flowing over the commutator ring when a thermoset material is used is described with reference to the prior art armature of FIGS. 21 and 22. Like elements will be referred to with the same reference numbers and the discussion will focus on the differences.

An armature 501 has a shaft 503 on which commutator 500, which is a stuffer type commutator, is mounted in known fashion. Stuffer type commutator 500 has commutator ring 516 with slots 504 (FIG. 21) between segments 514. Ends of magnet wires 510 are pressed into slots (not shown) in ends 508 of segments 514 of commutator ring 516. Armature 501, however, does not include inserts 502.

A flexible seal is used to prevent flash from thermoset material 3800 from flowing into slots 504 between segments 514 of commutator 500 and/or from flowing over commutator ring 516. The flexible seal may illustratively an annular flexible seal, such as annular flexible seal 3900. Annular flexible seal 3900 is disposed around commutator ring 516 so that it sits against axial outer facing surfaces of ends 508 (sometimes known as risers) of commutator 500. A radially inner surface 3902 of annular flexible seal 3900 sits against a resin dam 3904 of a cylindrical core 3906 of commutator 500.

Shaft 503, with commutator 500 and lamination stack 505 thereon, are placed in a mold 3908 (shown representatively in FIG. 39) and thermoset material molded around them to form armature 501 in a manner similar to that described above but with the following differences. The contact between annular flexible seal 3900 and resin dam 3904 is sufficient to cause a flow front of the thermoset material being molded to stop. This prevents the thermoset material from reaching the slots 504 between segments 514 of commutator 500 and from flowing over commutator ring 516. After molding, the annular flexible seal 3900 is illustratively removed from commutator 500. It may alternatively be left on commutator 500.

Alternatively, in a manner similar to that discussed above, rather than placing annular flexible seal 3900 around commutator ring 516 before shaft 503 with commutator 500 and lamination stack 505 thereon are placed in the mold, the annular flexible seal 3900 is disposed in the mold. Then, shaft 503 with commutator 500 and lamination stack 505 thereon is placed in the mold so that the end of shaft 503 projecting from commutator 500 extends through annular flexible seal 3900 so that annular flexible seal 3900 butts up against axial outer facing surfaces of end 508 of commutator 500. In an aspect, each annular flexible seal 3900 is used for several shots. In an aspect, the annular flexible seal 3900 remains in place in the mold for the several shots.

Annular flexible seal 3900 may illustratively be an o-ring made of a soft rubber or rubber like material, such as silicone, so that it easily conforms to the irregular surface on commutator 500, such to the axial outer facing surfaces of ends 508 of commutator 500. Annular flexible seal 3900 may illustratively be shapes other than an o-ring, such as a sleeve or a boot. For example, annular flexible annular flexible seal 3900 could be a sleeve 4000 (FIG. 40) or a boot 4100 (FIG. 41), or tape wrapped around commutator 500. Annular flexible seal 3900 may be made of material other than silicon, such as rubber or paper, as long as the material is sufficiently soft or pliable to conform to the irregular surfaces on commutator 500 and is otherwise suitable for use in molding the thermoset material being molded. The cross-section of annular flexible seal 3900 can be round, square, or other shapes.

The thermoset material referenced with regard to the aspects described with reference to FIGS. 38-46 liquifies during molding so that it flows as a liquid. The thermoset material may illustratively be a glass reinforced polyester resin. But it should be understood that this is only one example of the thermoset material that can be used and that other thermoset materials can be used. It should also be understood that the aspects described with reference to FIGS. 38-46 may be utilized with any encapsulating material that is liquid during molding and not just thermosets.

Figure 22:
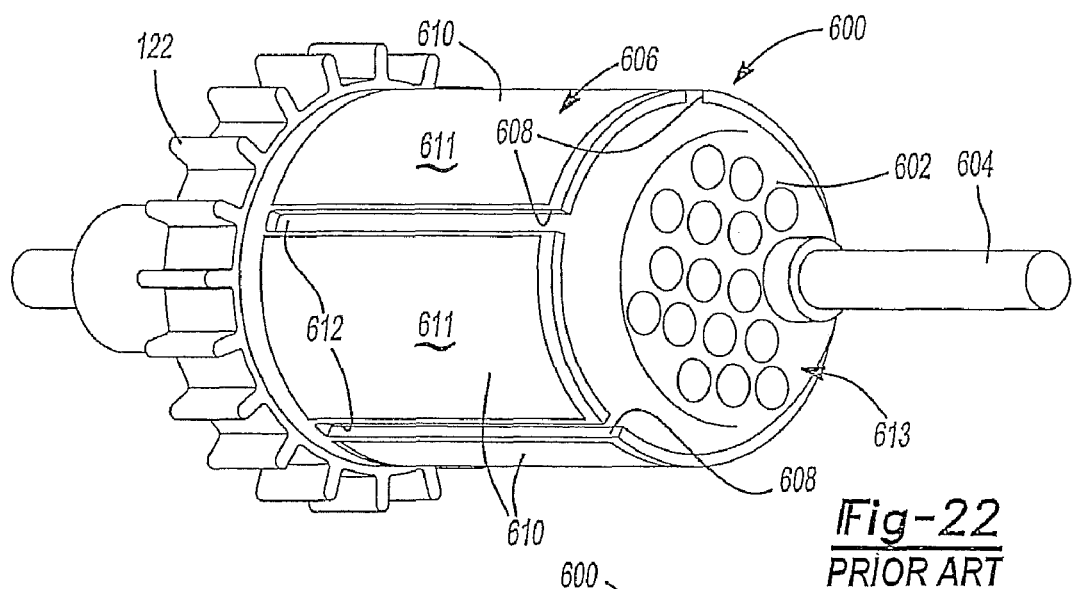
FIG. 22 is a perspective view of a prior art armature encapsulated with a thermally conductive plastic with features for enhancing heat transfer.

Turning to FIG. 22, another aspect of the prior art is described. An armature 600 is encapsulated by molding thermally conductive plastic 602 around its shaft 604 and lamination stack 606. The tool or mold used to mold the plastic 602 is configured so that the slots 608 between teeth 610 of lamination stack 606 are cored out. As used herein, cored out means that the plastic 602 is not molded to top surfaces 611 of the lamination teeth 610, so that the plastic molded in the slots 608 is recessed from the top surfaces of the lamination teeth 610, forming recesses 612, through which cooling air can flow. By coring out slots 608, heat transfer is improved, less plastic is used and recesses 612 can be used by tools in subsequent armature manufacturing operations, such as for orienting, locating and/or indexing armature 600. In this regard, the tool used in molding plastic 602 can have features, such as blades, that fit within slots 608 to form recesses 612 and these blades can also hold armature 600 in the correct radial position during molding. The surface of plastic 602 can be textured to increase the surface area of the plastic and/or cause turbulence, thus increasing heat transfer, without taking up additional space. The texturing can take the form of a pattern 613, such as a diamonds, squares, circles, bumps, dimples, and the like. Illustratively, the texturing is done on the surface of plastic 602 at an end of lamination stack 606 opposite an end of lamination stack 606 where fan 122 is formed.

Figure 23:
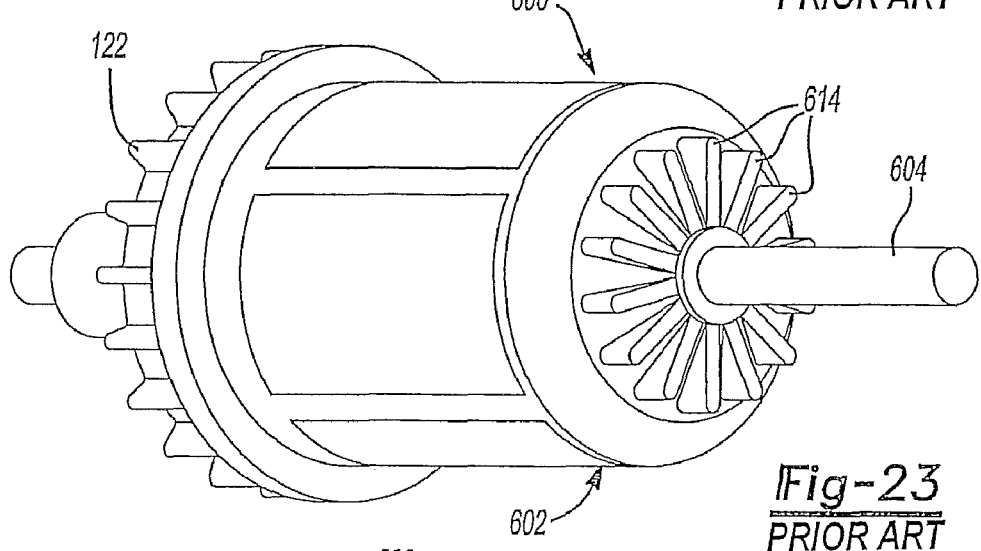
FIG. 23 is a perspective view of another prior art armature encapsulated with a thermally conductive plastic with features for enhancing heat transfer.
Figure 34:
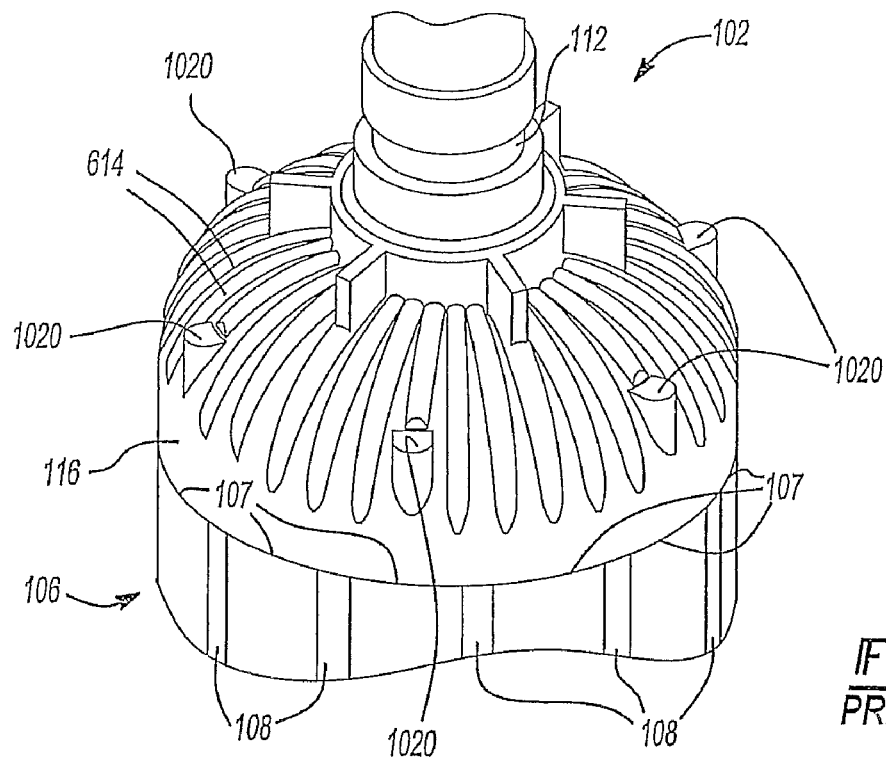
FIG. 34 is a perspective view of a portion of a prior art armature molded in the three plate mold of FIG. 32 opposite an end of the armature on which a commutator is affixed.
Figure 35:
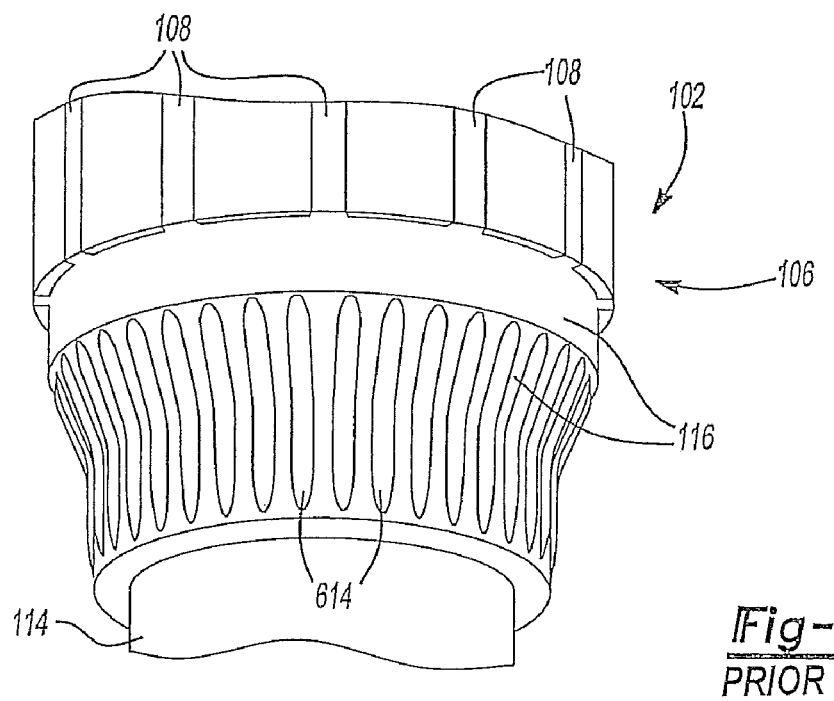
FIG. 35 is a perspective view of a portion of a prior art armature molded in the three plate mold of FIG. 32 adjacent a commutator.

FIG. 23 shows a variation of the just discussed aspect of the prior art. The same reference numbers are used to identify like elements. In FIG. 23, when plastic 602 is molded to encapsulate armature 600, integral features are formed, such as fins 614, that increase surface area and create turbulence. FIGS. 34 and 35 show differently shaped fins 614, only two of which are identified by reference numeral 614 therein.

Figure 24:
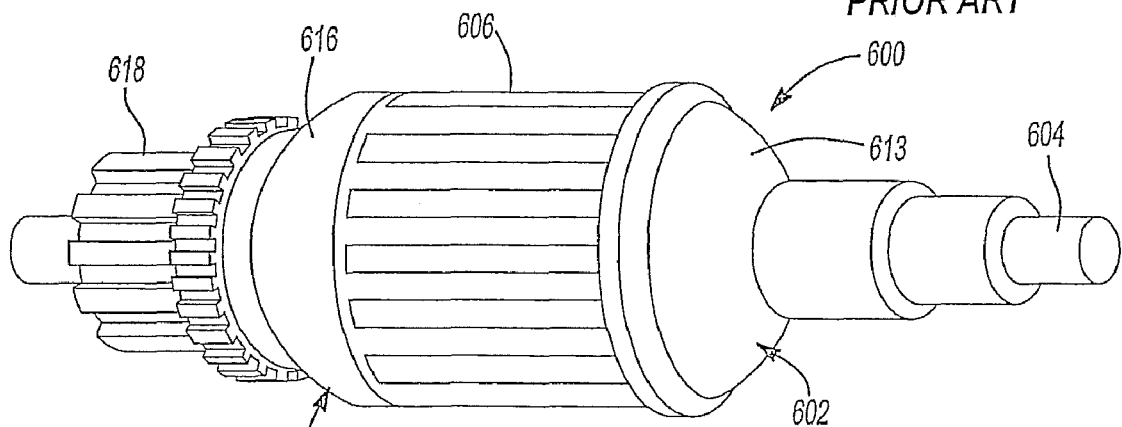
FIG. 24 is a perspective view of a prior art armature encapsulated with a thermally conductive plastic with a necked down region adjacent the commutator.

FIG. 24 shows another variation of the just discussed aspect of the prior art. The same reference numbers are used to identify like elements. In FIG. 24, plastic 602 is molded so that a necked down region 616 is formed between the lamination stack 606 of armature 600 and commutator 618, which reduces the amount of plastic required. The surface of plastic 602 is textured as described above to enhance heat transfer, or features such as fins 614 (FIG. 24) formed thereon.

In addition to or in lieu of forming the features such as recesses 612, texture pattern 613, fins 614 and necked down region 616 during molding plastic 602, they can be formed in secondary operations such as milling, turning or grinding. However, forming these features during molding plastic 602 allows less plastic to be used than if the plastic 602 is removed from armature 600 during a secondary operation to form the feature.

Turning to FIGS. 25-27, another aspect of the prior art is described that provides better thermal conductively than that provided by using thermally conductive plastics, which typically have a thermal conductivity in the 1 to 10 W/m-K. Features 700 are insert molded onto armature 102 during the molding of plastic 116 or features 700 are molded from plastic 116 and then metallized. Features 700 may illustratively be a finned metal or ceramic end coil cover 700' that is insert molded onto armature 102 during the molding of plastic 116. Plastic 116, which is illustratively thermally conductive plastic as described above, is molded to form a thin layer between end coils 117 of magnet wires 110 and the finned end coil cover 700. With specific reference to FIG. 25, finned end coil cover 700' also includes a fan 702 shown in phantom in FIG.

25 affixed thereto or formed integrally therewith. In a variation, finned end coil cover 700' is molded from a thermally conductive plastic having a higher thermal conductivity than plastic 116. With specific reference to FIGS. 25 and 27, features 700, such as fins, posts, or blades which are designated as 700" in FIG. 27, are molded out plastic 116 when plastic 116 is molded to encapsulate armature 102. End domes 704 including the features 700" are then covered with a thin metallic layer 706, such as by metallizing them with a vapor deposition or other metallization process.

In another aspect of the prior art, the plastic, such as plastic 116 (FIG. 5) molded around lamination stack 106, portions of commutator 114 and armature shaft 112 helps hold lamination stack 106 and commutator 114 on armature shaft 112 and improves twist torque. Twist torque, as that term is commonly understood, is the amount of torque differential between armature shaft 112 and lamination stack 106 or commutator 114 that can be withstood before armature shaft 112 turns within lamination stack 106 or commutator 114. In a variation of this aspect of the prior art, an armature shaft 112a (FIG. 28) is provided with features that interlock with the plastic 116 molded around them to further improve twist torque. These features can include one or more flats 710, projections 712, or other features that interlock with the plastic 116 when plastic 116 is molded around them.

Figure 29:
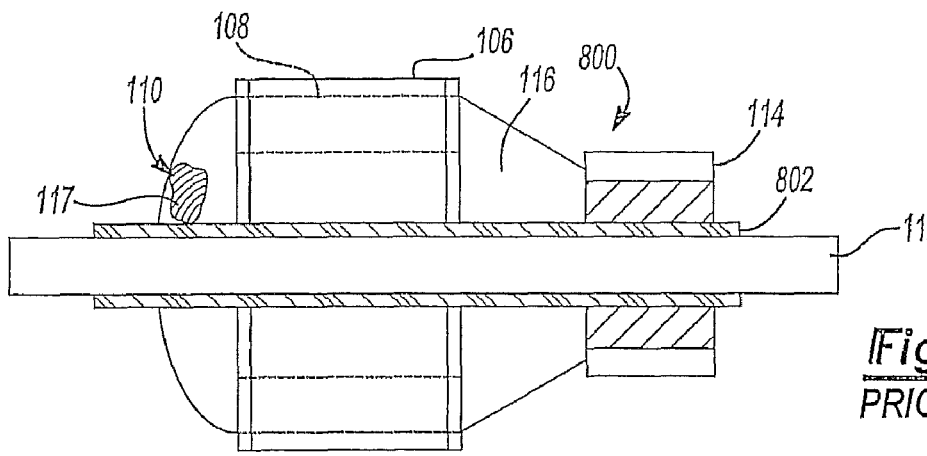
FIG. 29 is a perspective view of a prior art double insulated armature.
Figure 30:
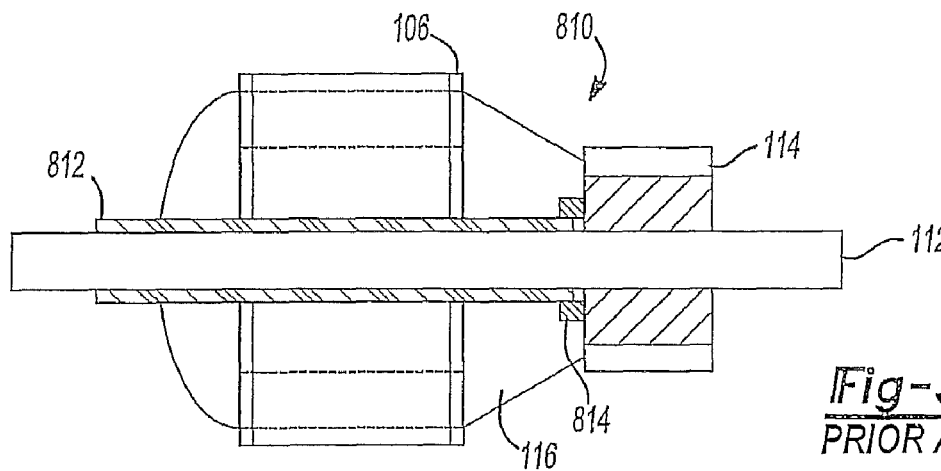
FIG. 30 is a perspective view of another prior art double insulated armature.

Turning to FIGS. 29 and 30, another aspect of the prior art is described where the armature is a double insulated armature. Elements in FIGS. 29 and 30 common to the elements in FIG. 5 are identified with the same reference numerals.

FIG. 29 shows a double insulated armature 800 having a protecting insulating sleeve 802 disposed around shaft 112. Commutator 114 and lamination stack 106 are mounted on shaft 112 with insulating sleeve 802 disposed between lamination stack 106 and shaft 112 and between commutator 114 and shaft 112. Armature 800 includes magnet wires 110 wound in slots 108 of lamination stack 106. Plastic 116 is molded over the armature 800 so that the plastic 116 flows into and through each of the slots 108 and around end coils 117 of magnet wires 110.

Armature 800 is illustratively formed by first placing insulating sleeve 802 on shaft 112. It should be understood that insulating sleeve can be made of other materials, such as high-temperature, glass reinforced thermosetting resin. It could also be preformed and then placed on shaft 112. Shaft 112 with insulating sleeve 802 thereon is then in situ molded with lamination stack 106, such as by molding plastic 116. Plastic 116 is electrically insulative and forms the functional insulation layer on the axial ends and in the slots 108 of armature 800. In this regard, the mold is made so that plastic 116 is molded in slots 108 so as to coat the walls of lamination stack 106 leaving the remainder of slots 108 open, as well as to form the end spiders around the axial ends of lamination stack 106, such as described above with reference to FIG. 3. Magnet wires 110 are then wound in slots 108 and ends of magnet wires 110 (FIG. 5) affixed to commutator 114, which has been placed on shaft 112 over insulating sleeve 802. The resulting assembly is then placed in a suitable molding tool and plastic 116 molded around the desired elements of armature 800. Plastic 116 is illustratively a thermally conductive plastic as described above and it is injection molded around the elements of armature 800. Plastic 116 is also illustratively electrically insulative.

In double insulated armatures, it is important that the protective insulation barrier be complete and uninterrupted. If the insulated sleeve is bridged by the functional insulation, particularly if the functional insulation is a thermally conductive resin, there is the possibility of excessive leakage currents during overly abusive loads as the thermally conductive resin's electrical properties, e.g., dielectric strength and bulk resistivity, deteriorates at nearly destructive temperatures.

An uninterrupted barrier is easy to achieve when the lamination stack, windings and commutator are all separated from the shaft by the insulative sleeve, such as when the insulative sleeve runs the entire length of the shaft such as shown with respect to sleeve 802 and shaft 112 in FIG. 29. However, design constraints sometimes do not allow a sufficient radial distance for the commutator to be placed on the insulative sleeve and must be placed directly on the shaft without the insulative sleeve therebetween. In these cases, the commutator must be constructed so that its insulation barrier provides reinforced insulation spacings and properties.

Turning to FIG. 30, a prior art double insulated armature 810 with commutator 114 placed directly on shaft 112 without an insulative sleeve between it and shaft 112 is shown. Insulative sleeve 812 is disposed on shaft 112 between lamination stack 106 and shaft 112 and extends axially up to commutator 114. Any gap between the end of insulative sleeve 812 and commutator 114 is sealed by high temperature seal 814 and prevents plastic 116, which is illustratively thermally conductive plastic as discussed, from flowing into any gap between the end of insulative sleeve 812 and commutator 114 when plastic 116 is molded to encapsulate armature 810. Instead of seal 814, labyrinths, dams or high temperature gaskets can be used.

Figure 31:
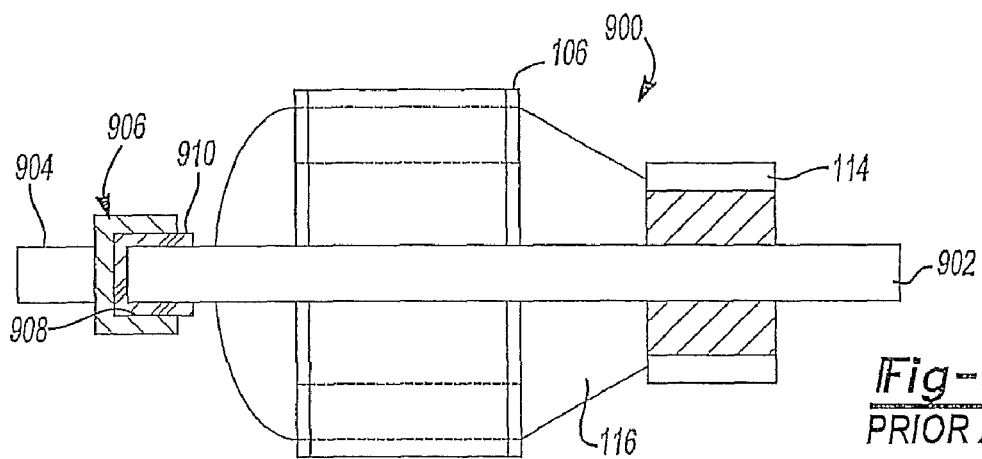
FIG. 31 is a perspective view of another prior art double insulated armature.
Figure 32:
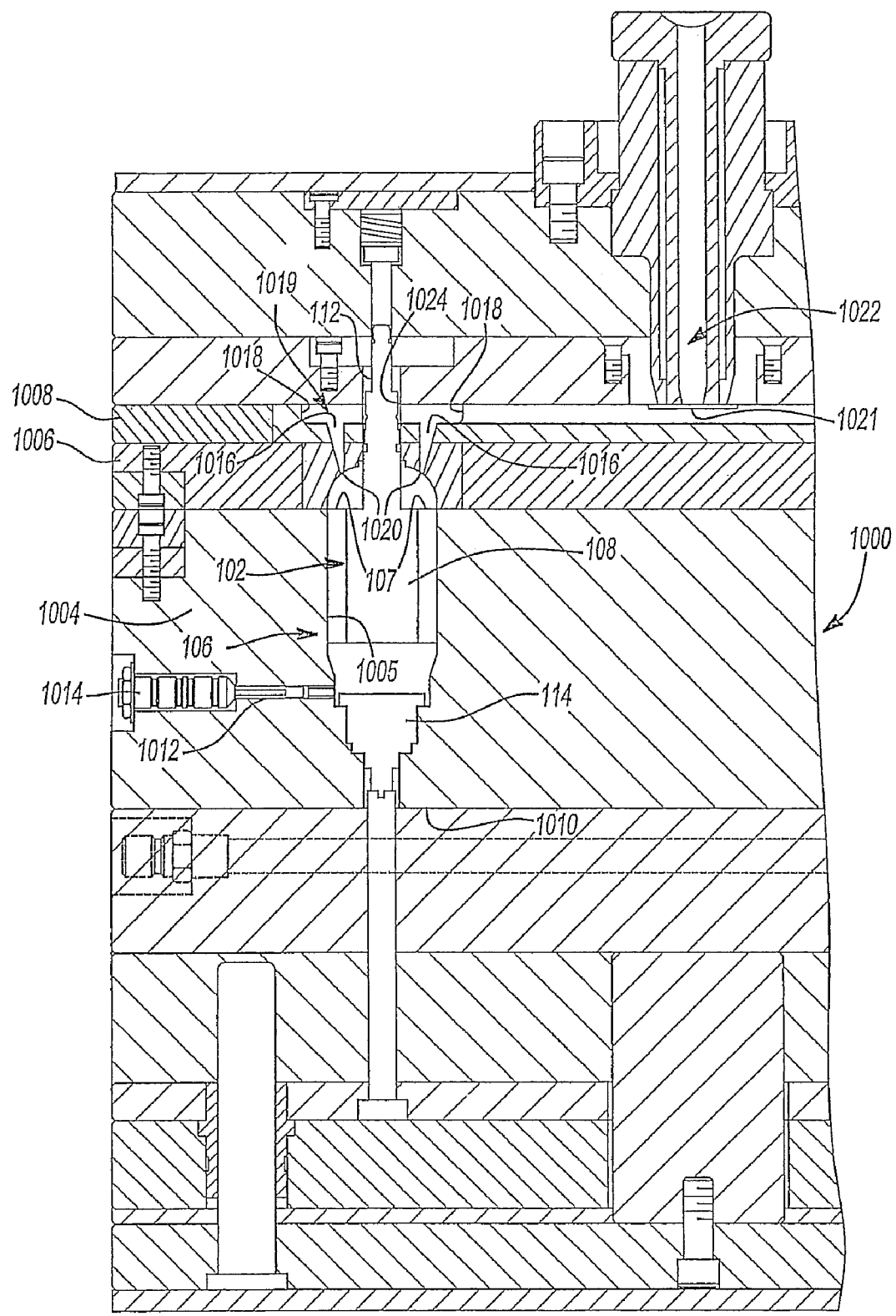
FIG. 32 is a side section view of a prior art three plate mold used to encapsulate an armature.
Figure 33:
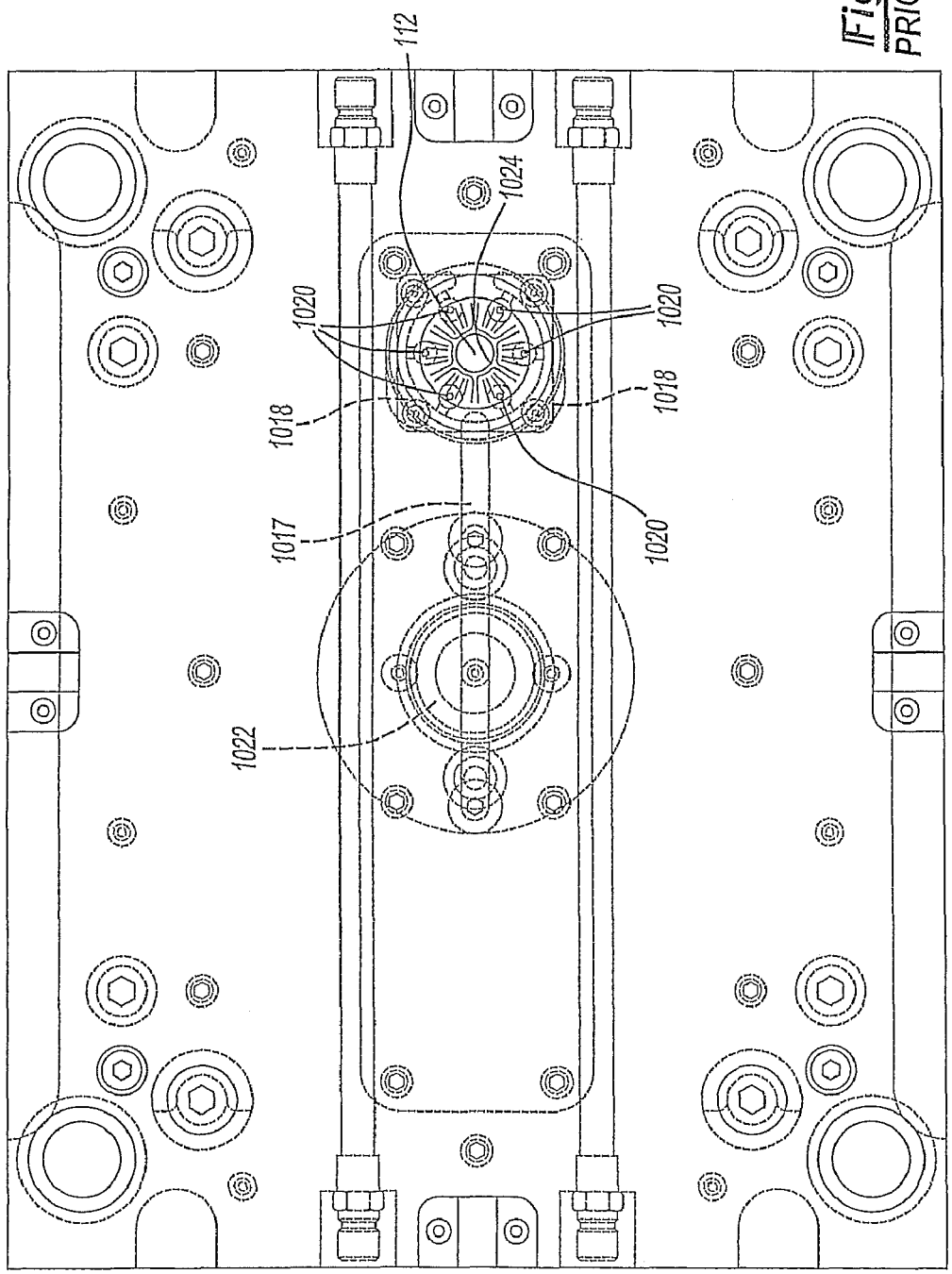
FIG. 33 is a top view of the prior art three plate mold of FIG. 32.

Turning to FIG. 31, prior art alternative embodiment of a double insulated, encapsulated armature is shown. Armature 900 has lamination stack 106 and commutator 114 directly mounted on an internal shaft 902 and is encapsulated with plastic 116, which is illustratively thermally conductive plastic as discussed. Internal shaft 902 is coupled to an external pinion 904 and bearing journal 906 that has a cylindrical cavity 908 lined with a layer of electrical insulation 910. While FIG. 31 shows internal shaft 902 received in insulated cylindrical cavity 908, it should be understood that bearing journal 906 could be reversed and external pinion 904 received in insulated cylindrical cavity 908. The foregoing embodiment shown in FIG. 31 provides a double-insulated armature where the protecting insulation is distinct and discrete from the heat generating portions of the armature.

Turning to FIGS. 32-35, a prior art three-plate mold 1000 used for molding plastic 116 to encapsulate armature 102 is shown. Elements in FIGS. 32-35 that are common with elements in FIG. 5 will be identified with the same reference numerals. Three plate mold 1000 is shown in a molding machine 1002, which is illustratively a plastic injection molding machine, with armature 102 therein. Three plate mold 1000 includes core plate 1004, cavity plate 1006 and runner plate 1008. Core plate 1004 has a generally can shaped cavity 1005 in which armature 102 is received, commutator 114 first. That is, armature 102 is received in core plate 1004 with commutator 114 adjacent an end or bottom (as oriented in FIG. 32) 1010 of core plate 1004. Core plate 1004 may include a pressure transducer port 1012 in communication with a pressure transducer 1014 therein.

Runner plate 1008 has a hole 1024 therein through which armature shaft 112 extends when armature 102 is in mold 1000. In runner plate 1008, a runner 1017 splits into two semicircular runners 1018 (shown in dashed lines in FIG. 33) around hole 1024 in which shaft 112 of armature 102 is received when armature 102 is in mold 1000. Semicircular runners 1018 form a ring runner 1019. The runner 1017 extends to an exit 1021 of a hot sprue 1022. Cavity plate 1006 includes drop passages 1016 extending from ring runner 1019 in runner plate 1008 to gates 1020. Gates 1020 are preferably located so that they are between slots 108 of armature 102 when armature 102 is in mold 1000 and in spaced relation to ends 107 of slots 108. With specific reference to FIG. 34, a gate 1020 is located between and above adjacent slots 108 of lamination stack 106. Consequently, each gate 1020 feeds two slots 108 of lamination stack 106.

Figure 36:
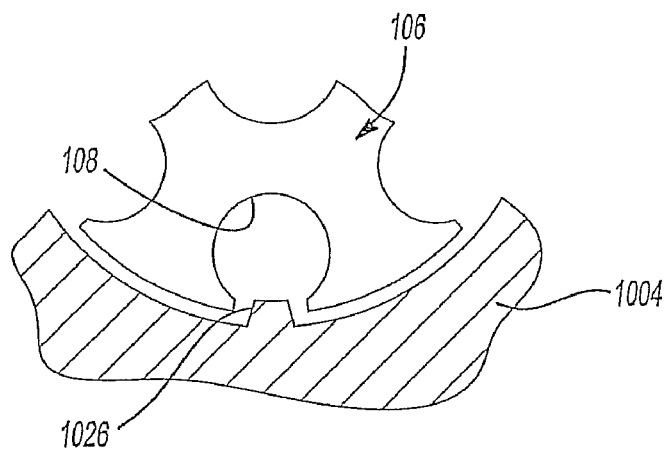
FIG. 36 is a portion of a section view of the prior art three plate mold of FIG. 32 and a portion of a prior lamination stack being encapsulated.

With specific reference to FIG. 36, core plate 1004 may have keys 1026 that engage slots 108 in lamination stack 106 of armature 102 to locate armature 102 in mold 1000 so that gates 1020 are disposed between adjacent slots 108 of lamination stack 106. Illustratively, each slot 108 has one of keys 1026 projecting into it, which key illustratively extends the length of that slot 108. The keys 1026 are preferably sized to provide thin wall flow regions before the outside diameter of lamination stack 106. This causes plastic 116 to start freezing off before it reaches the outside diameter of lamination stack 106, minimizing the chance of flashing to the outside diameter of lamination stack 106. Also, locating gates 1020 between slots 108 may prevent plastic 116 from "jetting" down the slots 108 before filling thin wall areas above the coils of magnet wires 110. This is important with most thermally conductive plastics in that once the melt front stops, the thermally conductive plastic quickly freezes and won't flow again. Thus, if the plastic 116 "jets" down the slots, it may not be possible to pack out the thin wall areas afterwards.

In operation, armature 102 (in its pre-encapsulated state) is placed in core plate 1004 of mold 1000, commutator 114 first. Cavity plate 1006 is then closed over the other end of armature 102 and runner plate 1008 closed over cavity plate 1006. Plastic 116 is then injected into mold 1000, flowing from hot sprue 1022 through runner 1017 into semicircular runners 1018 of ring runner 1019, through drop passages 1016 in cavity plate 1006, through gates 1020 and around armature 102 in mold 1000. It should be understood that other gate configurations can be used, such as ring and flash gates on three-plate molds and tab gates on two-plate molds.

The pressure in the cavity of mold 1000 is monitored using pressure transducer 1014. Port 1012 in core plate 1004 is illustratively positioned toward bottom 1010 of core plate 1004 so that the pressure in the cavity of mold 1000 is monitored generally at the opposite ends of where gates 1020 are located. When the pressure in the cavity of mold 1000 reaches a predetermined level, as sensed by pressure transducer 1014, the injection molding machine is switched from its fill stage to its packing stage. As is known, during the fill stage, the shot pressure is high. Once the mold cavity is nearly filled, the injection molding machine is switched to the packing stage where the shot pressure is backed off to a lower level. The shot pressure is then maintained at this lower level until the plastic hardens, typically determined by waiting a set period of time. By using the pressure in the cavity of mold 1000 to determine when to switch from the fill stage to the packaging stage, as opposed to constant molding parameter such as shot size, injection time, etc., effects of variations in the material properties of the plastic can be reduced.

Illustratively, this predetermined pressure is set at a level that indicates that the cavity of mold 1000 is nearly filled with plastic 116. A technique known as "scientific molding" is illustratively used to control injection molding machine 1002 to minimize the chance of flashing at commutator 114. One such scientific molding technique is the DECOUPLED MOLDING[SM] technique available from RJG Associates, Inc. of Traverse City, Mich.

Pressure transducer 1014 could also be used to determine if a part is molded correctly. That is, a determination is made whether the pressure in the cavity of mold 1000 reached a sufficient level so that the cavity of mold 1000 was completely filled. If not, the part is rejected. In this regard a good/bad indicator may be driven based on the monitored pressure in the cavity of mold 1000 to alert the operator of injection molding machine 1002 whether the molded part is good or bad. Injection molding machine 1002 may also be configured to automatically accept or reject a part based on the monitored pressure.

Figure 37:
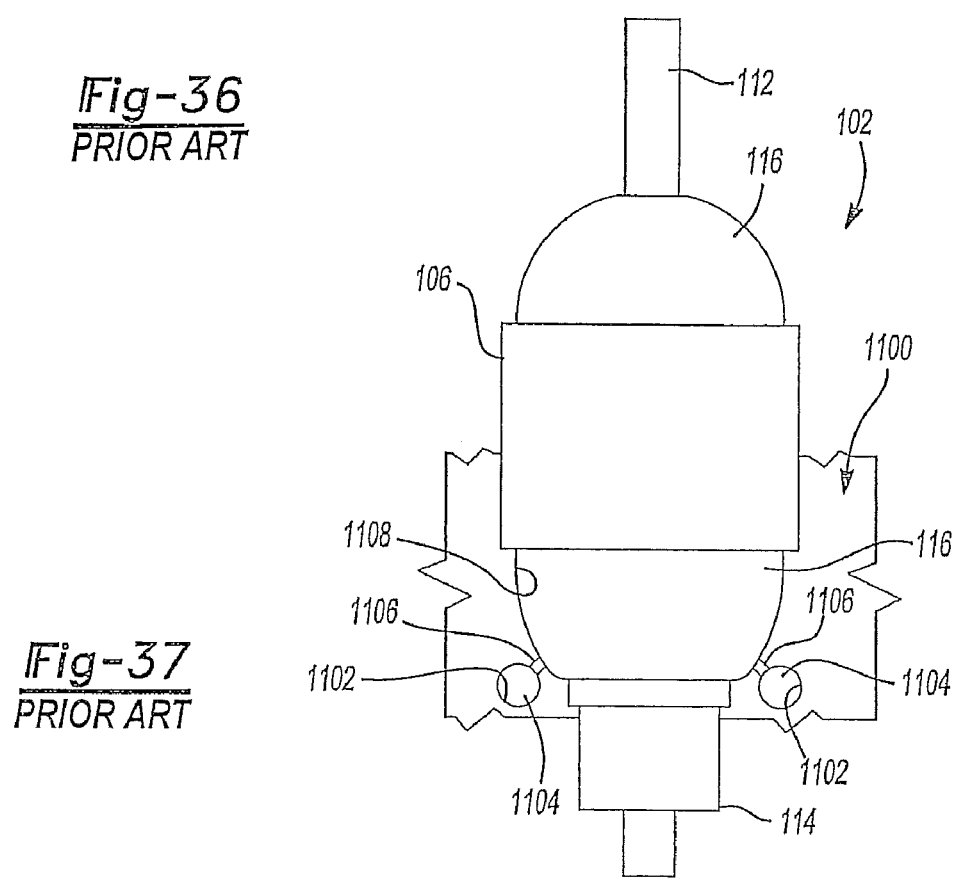
FIG. 37 is a representative view of a prior art two-plate mold having overflow tab cavities.

Referring to FIG. 37, a prior art mold 1100, which is illustratively a two-plate mold, is shown schematically. Two plate mold 1100 is formed to have overflow tab cavities 1102 to allow overflow tabs 1104 to be formed when plastic 116 is molded to encapsulate armature 102. Illustratively, overflow tabs are formed adjacent commutator 114. Overflows tabs 1104 help control molding pressure at commutator 114, helping to prevent flash while still providing a complete fill and encapsulating of magnet wires 110 with plastic 116. Gates 1106 extend from cavity 1108 of mold 1100 to each overflow tab cavity 1102. Gates 1106 are sized so that as molding pressure builds up in cavity 1108, the plastic 116 flows into the overflow tab cavities 1102 before flashing over commutator 114. Because most thermally conductive plastics set up quickly, delaying the melt front at the commutator 114 enables the plastic 116 to freeze off in the area of commutator 114 so that when the overflow tab cavities 1102 are full and the pressure in cavity 1108 continues to build up, the risk of flash over commutator 114 is minimized or eliminated. The de-gating process would illustratively accommodate the overflow tabs 1104 as additional runners that are removed during the de-gating process so that no additional cycle time results. It should be understood that overflow tabs 1104 can be any shape or size sufficient to delay the build-up of pressure in mold 1100.

In another aspect of the prior art, features that may illustratively be molded when the armature, such as armature 102, is encapsulated with plastic, such as plastic 116, but that must be physically robust, can be pre-formed, such as by pre-molding them out of a sufficiently strong plastic, and then insert molded when the armature is encapsulated. This allows the use of a thermally conductive plastic that does not provide the physical robustness required by these features but has other properties, such as better thermal conductivity, than the plastics that provide the physical robustness required by these features. With reference to FIG. 5, fan 122 is an example of a feature that requires a certain degree of physical robustness. Fan 122 can be pre-formed, such as by pre-molding it if a plastic that provides the necessary physical robustness and then insert molded to attach it to armature 102 when armature 102 is encapsulated with plastic 116. Plastic 116 can then be selected from plastics having the optimum characteristics for encapsulating armature 102 even if such plastics do not provide the physical robustness needed by fan 122. This would permit a lower cost material to be used for plastic 116 than would be the case if plastic 116 is also used to mold fan 122 in the manner discussed above. Use of the higher cost plastic that provides more robust physical characteristics would then be limited to those features that require the greater degree of physical robustness. This would also permit a plastic having high thermal conductivity but that is structurally weak or has little impact strength to be used for plastic 116 with fan 122 being pre-formed of the higher strength plastic.

Figure 15:
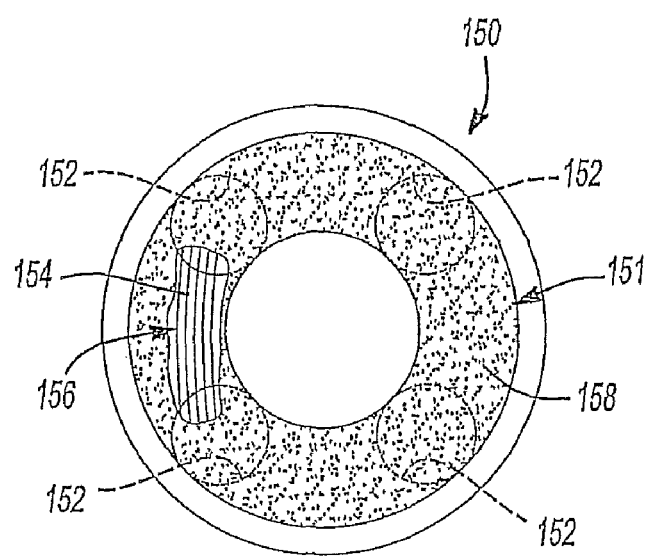
FIG. 15 is a view of a section of a prior art stator for an electric motor encapsulated with a thermally conductive plastic.

Many of the principles described above are applicable to other coil structures used in dynamoelectric machines, such as stators for electric motors and coil structures for generators and alternators. FIG. 15 shows a prior art stator 150 for an electric motor, such as motor 100 (FIG. 5). Stator 150 includes a lamination stack 151 having a plurality of slots 152 therein. Magnet wires 154 are wound in slots 152 to form coils 156. Thermally conductive plastic 158 is molded at least partially around magnet wires 154 and preferably completely encapsulates magnet wires 154. Similarly, the surface of plastic 158 can be molded with features, such as fins, or textured to enhance heat transfer, the features metallized, or features pre-formed and insert molded when plastic is molded around magnet wires 154.

Figure 16:
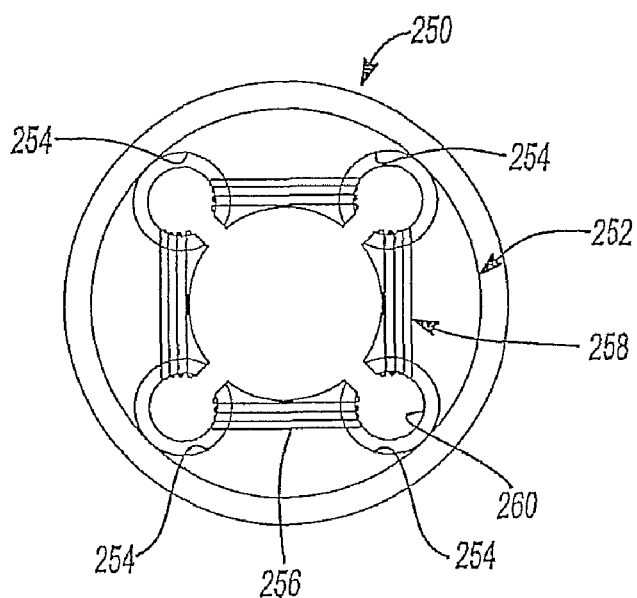
FIG. 16 is an end view of a section of a prior art stator with a thermally conductive plastic molded in slots in a lamination stack to form slot liners.

FIG. 16 illustrates the application of the prior art described with respect to FIG. 3 to a stator. A stator 250 has a lamination stack 252. Lamination stack 252 has a plurality of slots 254 lined with slot liners 260 made of thermally conductive plastic. Magnet wires 256 are wound in slots 254 forming coils 258. Thermally conductive plastic is molded in slots 254 to form slot liners 260, which electrically insulate magnet wires 256 from lamination stack 252 as well as enhance heat transfer from magnet wires 256. In this regard, the thermally conductive plastic is selected to have a desired thermal conductivity and dielectric strength or electrically insulative properties.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of making an armature, comprising:
   placing a stuffer type commutator having a commutator ring with a plurality of segments with slots between adjacent segments and a lamination stack on an armature shaft to form an assembly;
   placing ends of coil windings wound in slots in the lamination stack in wire receiving slots at axial inner ends of the commutator ring segments;
   placing the armature shaft, commutator and lamination stack assembly in a mold;
   sealing the commutator ring with a seal around the commutator ring near the wire receiving slots; and
   molding an encapsulating material that is liquid during molding around at least portions of the armature shaft, commutator and lamination stack, the sealing of the commutator ring preventing the encapsulating material from flowing over the commutator ring or into the slots between the commutator ring segments.

2. The method of claim 1 including placing the seal in the mold prior to placing the armature shaft, commutator and lamination stack assembly in the mold.

3. The method of claim 1 including placing the seal on the commutator ring prior to placing the armature shaft, commutator and lamination stack assembly in the mold.

4. The method of claim 1 including stopping a flow front of the encapsulating material with a contact between the seal and a resin dam of the commutator.

5. The method of claim 1 wherein sealing the commutator ring with the seal includes sealing it with the seal disposed against axial outer facing surfaces of risers of the commutator ring.

6. The method of claim 1 wherein sealing the commutator ring with the seal includes sealing it with a flexible seal.

7. The method of claim 6 wherein sealing the commutator ring with the flexible seal includes sealing it with an annular flexible seal.

8. The method of claim 6 wherein sealing the commutator ring with the flexible seal includes sealing the commutator ring with any of an o-ring, a sleeve, a boot, or tape wrapped around the commutator.

9. The method of claim 1 including stopping a flow front of the encapsulating material with a contact between the flexible seal and a resin dam of the commutator.

10. The method of claim 1 wherein sealing the commutator ring with the seal includes sealing with a seal made of a material that is at least semi-rigid.

11. The method of claim 10 including reinforcing the commutator by leaving the seal on the commutator ring after molding.

12. The method of claim 10 further including disposing an outer seal made of material that is at least semi-rigid at an axial outer end of the commutator ring.

13. The method of claim 12 including providing a flow channel around the armature shaft for the encapsulating material to flow through.

14. The method of claim 12 including reinforcing the commutator by leaving the seal and the outer seal on the commutator ring after molding.

15. The method of claim 1 wherein molding the encapsulating material includes molding a thermoset material.

16. The method of claim 1 wherein the mold has segments, each segment having an inner end with a sharp radial inner arcuate edge, and sealing the commutator ring includes urging the segments against the commutator ring so that the sharp radial inner arcuate edges close around the commutator ring to from a seal around the commutator ring.

\* \* \* \* \*